US012748621B1

(12) United States Patent
Damodar et al.

(10) Patent No.: US 12,748,621 B1
(45) Date of Patent: Sep. 29, 2026

(54) SCHEDULING TASKS AT DYNAMICALLY-ALLOCATED RESOURCE POOLS USING SHARE IDENTIFIERS AND FAIRNESS PARAMETERS

(71) Applicant: Amazon Technologies, Inc., Seattle, WA (US)

(72) Inventors: Aswin Damodar, Seattle, WA (US); Stephen William Kendrex, Seattle, WA (US); Xu Yang, Seattle, WA (US); Gopal Shukla, Seattle, WA (US); Jason Roy Rupard, Renton, WA (US); Cheng-Hao Lee, Seattle, WA (US); Ujjwal Kamal Kabra, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 765 days.

(21) Appl. No.: 17/489,511

(22) Filed: Sep. 29, 2021

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01); *G06F 9/505* (2013.01); *G06F 2209/5011* (2013.01)

(58) Field of Classification Search
CPC ...... G06F 9/4881; G06F 9/5038; G06F 9/505; G06F 2209/5011
See application file for complete search history.

(56) References Cited

U.S. PATENT DOCUMENTS

| | | | |
|---|---|---|---|
| 7,360,219 B2 | 4/2008 | Rhine | |
| 7,958,507 B2 | 6/2011 | Santos et al. | |
| 9,141,432 B2 | 9/2015 | Chen et al. | |
| 9,201,690 B2 | 12/2015 | Meng et al. | |
| 9,529,626 B2 | 12/2016 | Wang et al. | |
| 9,703,285 B2 | 7/2017 | Zhong | |
| 10,089,140 B2 | 10/2018 | Gupta et al. | |
| 10,572,306 B2 | 2/2020 | Kambatla | |
| 2015/0178135 A1 | 6/2015 | Wang | |
| 2018/0349183 A1* | 12/2018 | Popovic | H04L 41/0806 |
| 2020/0026579 A1* | 1/2020 | Bahramshahry | G06F 9/5077 |
| 2020/0174844 A1* | 6/2020 | Bergsma | G06F 9/5077 |

(Continued)

OTHER PUBLICATIONS

"Introduction to IBM Spectrum LSF," IBM—Serach in IBM Spectrum LSF 10.1.0, downloaded from https://www.ibm.com/docs/en/spectrum-lsf/10.1.0?topic=overview-lsf-introduction on Aug. 2, 2021, pp. 1-6.

(Continued)

*Primary Examiner* — Pierre Vital
*Assistant Examiner* — Abdou K Seye
(74) *Attorney, Agent, or Firm* — Robert C. Kowert; Kowert, Hood, Munyon, Rankin & Goetzel, P.C.

(57) ABSTRACT

A scheduling iteration with respect to a resource pool and a queue of tasks is conducted. Each task has a share identifier. A set of currently-in-use share identifiers is identified from the queued and running tasks. Using a fairness parameter, a first subset of the resource pool which is to be reserved for assignment to tasks with share identifiers that are not currently in use is determined. One or more resources of a second subset of the pool are assigned to tasks selected from the queue based on their respective share identifiers.

20 Claims, 10 Drawing Sheets

(56) References Cited

U.S. PATENT DOCUMENTS

| | | | | |
|---|---|---|---|---|
| 2020/0278886 | A1* | 9/2020 | Blake | G06F 9/5027 |
| 2021/0168827 | A1* | 6/2021 | Shin | G06F 9/4881 |
| 2021/0200587 | A1* | 7/2021 | Yi | H04L 67/1008 |
| 2021/0224135 | A1* | 7/2021 | Yao | G06F 9/50 |
| 2021/0374814 | A1* | 12/2021 | Ma | G06F 9/50 |

OTHER PUBLICATIONS

"Slurm Workload Manager—Overview" downloaded from https://slurm.schedmd.com/overview.html on Aug. 2, 2021, pp. 1-7.

"Univa Grid Engine," Wikipedia, downloaded from https://en.wikipedia.org/wiki/Univa_Grid_Engine on Aug. 2, 2021, pp. 1-3.

* cited by examiner

SCHEDULING TASKS AT DYNAMICALLY-ALLOCATED RESOURCE POOLS USING SHARE IDENTIFIERS AND FAIRNESS PARAMETERS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public cloud provider network operators provide "full service" facilities that also include hardware resources and/or virtualized resources made available for use by their customers.

Clients of cloud provider networks can make use of effectively inexhaustible resources, typically accessed via programmatic interfaces of a suite of services. Some cloud provider networks implement task scheduling services. Clients can insert descriptions of tasks or jobs to be performed into logical queues maintained at such a scheduling service, and leave the details of identifying the necessary resources and executing the queued tasks on those resources to the scheduling service. A given queue may be used to process tasks of numerous end users or task requesters associated with a given organization.

Figure 1:
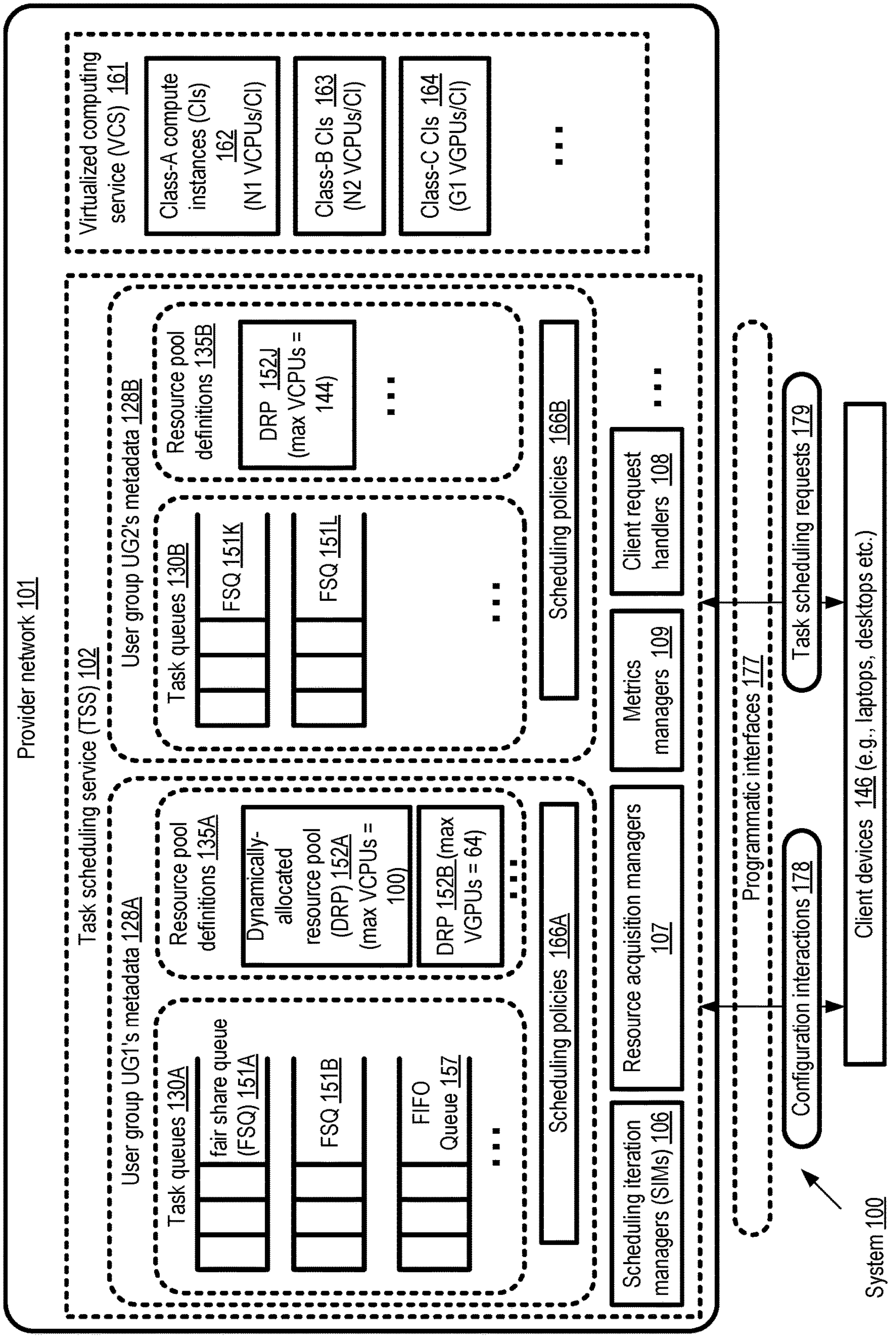
FIG. 1 illustrates an example system environment in which a task scheduling service that utilizes share identifiers and fairness parameters to assign resources from dynamically allocated resource pools to tasks may be implemented, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for scheduling tasks on dynamically-allocated resources (such as virtualized CPUs or compute instances) in accordance with client-specified fairness parameters at a task scheduling service (TSS) of a cloud provider network. The TSS implements task queues of several types, including for example fair-share queues as well as traditional first-in-first-out (FIFO) queues. Each such queue is set up for use by a dynamically modifiable group of authorized task requesters (such as a group of data scientists working on related projects), any of whom can submit requests for tasks (such as requests to train or execute a machine learning model) to the queue. A given queue is associated with at least one dynamically-allocated or dynamically-scaled pool of resources which can be assigned to execute the queue's tasks; pool parameters such as the maximum number of virtualized CPUs (VCPUs) that can be concurrently assigned to tasks from a given pool are chosen by clients of the TSS (e.g., administrators at organizations which use the TSS). The scheduling of queued tasks is typically performed iteratively, with a given scheduling iteration being initiated, for example, once every N seconds or based on triggering conditions. In FIFO queues, as indicated by the name, in a given scheduling iteration, queued tasks are processed in the order in which they arrived. For fair-share queues (FSQs), TSS clients can define scheduling policies whose parameters indicate the manner in which client-selected definitions of fairness rules are to be applied during scheduling iterations. Based on the policy parameters specified by the client for a given queue, tasks of that queue can often be executed in an order that differs from FIFO order. Furthermore, also depending on the client-specified policy, during a given scheduling iteration, a fraction of the resources of a pool may be kept unused or reserved for potential future use by task requesters not represented in the currently-queued or currently-running tasks.

A scheduling policy for an FSQ can indicate a set of allowed "share identifiers" (share IDs) which are to be used by the TSS when assigning a shared set of resources of a dynamically-allocated pool to tasks. Conceptually, each share ID corresponds to a respective share or fraction of the maximum capacity of an associated resource pool which can be assigned to tasks having that share ID, and multiple tasks can have the same share ID. In one simple example, an FSQ Q1 may be set up for N task requesters with respective identifiers TR1, TR2, . . . , TRN, and the scheduling policy SP1 for Q1 can indicate that each task is to be assigned a share ID identical to the task requester's identifier. Thus, at a given time, Q1 can comprise zero or more tasks with share ID TR1, zero or more tasks with share ID TR2, etc. More sophisticated techniques for determining the share ID of a given task can be specified for a given FSQ than simply using requester identifiers. Queued tasks can be selected for assigning available resources in a given scheduling iteration based at least partly on aggregated resource usage metrics for their share IDs, with the available resources being assigned starting with shared IDs with the lowest resource usage metric first. The definition of the aggregate resource usage metric (i.e., how exactly the metrics should be computed, whether a temporal decay factor is to be used to assign greater importance to more recent resource usage, etc.) can also be included in the scheduling policy. If tasks with share IDs TR1, TR2 and TR5 are in Q1 for a given scheduling iteration, and the aggregated resource usage metrics for the three shares are 5 (for TR1), 10 (for TR2), and 7 (for TR3), tasks with share ID TR1 are selected first for resource assignment, followed by tasks with share ID TR3 and then tasks with share ID TR2.

A scheduling policy can also optionally indicate a respective set of weights assigned to each share ID of the policy; for example, integers selected by the client for each share ID can be used as weights for the corresponding share, with a higher integer indicating a higher weight or preference when allocating resources. When assigning or distributing available resources from a pool, tasks whose share IDs have higher weights can be assigned proportionately more resources than tasks whose share IDs have lower weights. For example, if 12 VCPUs are to be assigned in a given scheduling iteration to queued tasks with share IDs TR1 and TR2, TR1 is assigned a weight of 2, and TR2 is assigned a weight of 1, then up to 8 VCPUs of the 12 can be assigned (if needed) to tasks with share ID TR1, and up to 4 VCPUs of the 12 available can be assigned (if needed) to tasks with share ID TR2. Note that the amount of resources available in a resource pool can be scaled up or down from one scheduling iteration to another, based for example on the number of the current set of queued and running tasks, the respective resource requirements of the queued and/or running tasks, and/or based on client preferences.

A scheduling policy for an FSQ can also indicate a fairness-based reservation parameter (sometimes referred to as simply a fairness parameter), which is used to determine how many (if any) resources of the associated pool are to be reserved for potential future assignment to tasks with currently-unused share IDs (if there are any such unused share IDs) of the policy during a given scheduling iteration. Consider a simple scenario in which per-task-requester based share IDs can be TR1, TR2, TR3, TR4, or TR5 for tasks queues at the FSQ Q1. In such a scenario, a fairness-based reservation parameter can for example require that in a scheduling iteration in which tasks with 4 out of 5 shares (say TR1, TR2, TR4, and TR5) are either queued or running on resources of the pool associated with Q1, 10% of the resource pool's maximum capacity is to be reserved for potential assignment to TR3 jobs (if any TR3 jobs arrive) in a subsequent scheduling iteration. By reserving some of the capacity of the pool, the scheduling policy can ensure that TR3 tasks are not starved of resources (for example by numerous long-lasting tasks of the other shares).

The TSS can allow clients to modify existing scheduling policies, e.g., to handle situations like the arrival of very high priority tasks. In such a situation involving high-priority tasks, a new share ID for the high-priority tasks can be defined and assigned a much higher weight than the weights assigned to existing share IDs. Alternatively, some of the pre-existing share IDs can simply be deleted temporarily from the policy after adding the new share ID to the policy, and the deleted share IDs can be added back to the policy if desired after the burst of high priority tasks ends. Within the tasks belonging to a given share (i.e., tasks with the same share ID), intra-share priority settings can be used to decide the order in which the tasks should be scheduled. New task requesters or users can also be accommodated easily, e.g., by defining a scheduling policy in which each a respective share ID is by default assigned to all the tasks requested by a given requester, or by modifying a scheduling policy by adding a new share ID for a new requester. For example, a respective per-requester share identifier may be indicated in an initial version of a scheduling policy for tasks requested by individual members of a group of initial authorized task requesters. Later, additional per-requester share identifiers may be added to the policy to accommodate additional requesters, or existing per-requester share identifiers may be removed to handle situations in which a given resource pool or queue is no longer to be accessed by a given requester.

As one skilled in the art will appreciate in light of this disclosure, certain embodiments may be capable of achieving various advantages, including some or all of the following: (a) enabling clients of a TSS to customize the manner in which resources are assigned to tasks directed to a given queue, based on client-specified fairness policies, while also providing the flexibility to modify policies as needed, (b) reducing the probability that tasks from any given user permitted to direct task requests to a given queue are starved of resources for long periods of time and/or (c) enhancing the user experience of queue administrators, by (for example) avoiding having to create large numbers of queues to handle fairness expectations of multiple task requesters, accommodating changes to the set of task requesters by applying simple changes to scheduling policies, etc.

According to some embodiments, a system may comprise one or more computing devices. The computing devices may include instructions that upon execution on or across the computing devices cause the computing devices to obtain an indication, via one or more programmatic interfaces, from a client of a TSS of a cloud provider network, that resources of a dynamically-allocated resource pool associated with a queue of tasks are to be allocated to individual tasks of the queue based at least in part on (a) respective share IDs associated with the individual tasks and (b) a fairness-based reservation parameter.

A plurality of scheduling iterations may be conducted with respect to the queue in various embodiments. A given scheduling iteration may include determining, from a current task set comprising at least (a) one or more tasks present in the queue and (b) one or more currently-executing tasks which were in the queue prior to their execution, a set of currently-in-use share IDs. Note that because multiple tasks can have the same share ID, the number of members of the current task set may exceed the number of members of the set of currently-in-use share IDs. The scheduling iteration may further comprise computing, using at least the fairness-based reservation parameter, a first fraction of the dynamically-allocated resource pool to be reserved for allocation, in a subsequent scheduling iteration, to tasks with share IDs which are not members of the set of currently-in-use share identifiers.

Share IDs of at least a subset of the current task set may be sorted based at least in part on respective aggregated resource usage metrics corresponding to the share identifiers in various embodiments. The scheduling iteration may also include assigning, to one or more tasks selected from the queue based at least in part on a result of the sorting, one or more resources from a second fraction of the dynamically-allocated resource pool. The second fraction may be determined or computed at least in part from the first fraction (e.g., by subtracting the first fraction from one). The amount of resources present in the dynamically-allocated resource pool in a given scheduling iteration may differ from the amount of resources present in the dynamically-allocated resource pool in a previous scheduling iteration in at least some embodiments. For example, the TSS may cause additional resources to be added to the pool between iterations, or during scheduling iterations if the rate at which task requests arrive increases, tasks with greater resource requirements than earlier tasks arrive, and/or the queue length increases; alternatively, resources may be removed from the pool between or during iterations in some embodiments, e.g., if the rate at which new task requests arrive falls or the resource demand of queued tasks falls consistently over some time interval. The resource population of a pool can change along any of several dimensions from one scheduling iteration to another in some embodiments. Consider an example scenario in which the capacity of the resource pool is specified in terms of VCPUs, but the resources are actually acquired or freed as compute instances of different categories, each of which include some number of VCPUs. In such a scenario, the number of VCPUs present in the pool may change from one scheduling iteration to another, the number of compute instances present in the pool may change, the sizes of some of the compute instances present in the pool may differ while the number of VCPUs remains the same, and/or the number of VCPUs may differ while the number of compute instances remains the same.

According to some embodiments, an indication of a respective weight to be assigned to the share IDs associated with the queue may be received prior to the scheduling iterations. A given scheduling iteration may further include selecting from the queue, based at least in part on respective weights assigned to their share IDs, one or more tasks to which one or more resources from the un-reserved subset of the resource pool are assigned, and/or distributing the resources from the un-reserved subset among tasks based on the weights assigned to the share IDs of the tasks. An upper limit on the number of resources that can be assigned to tasks with a given share ID may also be determined based at least partly on the weight assigned to the given share ID in some embodiments.

In some embodiments, to simplify the work required from a client or queue administrator with a queue to which large numbers (e.g., hundreds) of task requesters direct task requests, a matching mechanism may be used to assign weights to multiple share IDs, or to tasks from multiple users assigned the same share ID. For example, shared IDs of all requesters with user IDs beginning or ending with a particular set of characters (e.g., a set of characters corresponding to a given project name or department name within an organization) may be assigned a common weight. In various embodiments, the TSS may obtain, prior to a given scheduling iteration, via a programmatic interface, an indication of (a) a weight assignment methodology and (b) a matching methodology to be used to determine share IDs to which weights are to be assigned according to the weight assignment methodology. During the given scheduling iteration, a particular available resource from the resource pool may be assigned to a task based at least in part on a weight assigned to the task's share identifier using the combination of the weight assignment methodology and the matching methodology. In one example scenario, the weight assignment methodology may indicate that a total weight 1000 is to be distributed (e.g., as close to equally as possible) among all the share IDs which match a specified regular expression rel.

TSS clients may assign intra-share priorities to individual tasks in various embodiments, which can then be used to determine the order in which tasks with a given share ID are assigned resources. Thus, prior to a given scheduling iteration, via a programmatic interface, the TSS may obtain a first intra-share priority of a first task, and a second intra-share priority of a second task, where both the first and second tasks have the same share identifier. The given scheduling iteration may then comprise selecting the first task and the second task from the queue for allocation of resources from the resource pool, and assigning resources to the first task before assigning resources to the second task, based on the fact that the first task has a higher intra-share priority than the second task. One or more queued tasks with a different share identifier may not be selected for allocation of resources during the iteration.

In some embodiments, a given organization on whose behalf FSQs are set up at the TSS may include hundreds or thousands of potential task requesters, and numerous (e.g., tens or hundreds) of share IDs. The TSS may allow queue administrators of the organization to allow a given task requester to use only a subset of the share IDs defined for the FSQs. A queue administrator may use a programmatic interface of the TSS to specify an indication of a group of one or more share IDs that a given task requester is permitted to use. Before responding to a task request from that requester, the TSS may verify that the share ID indicated in the task request (or derived from the task request based on rules specified in the applicable scheduling policy) belongs to the permitted group.

Methodologies for computing per-share (i.e., per share ID) resource usage metrics, which can be used for selecting queued tasks for assignment of available resources, may be specified by clients of the TSS via programmatic interfaces in at least some embodiments. In at least some embodiments, metrics may be collected at the TSS on a per-share- ID basis. For example, the total number of tasks directed to a given FSQ per share ID may be tracked, the total amount of time tasks with a given share ID remained queued may be measured, the total number of tasks with a given share ID which were not assigned resources due to the use of the fairness-based reservation parameter (even when resource could have been allocated if resources did not have to be reserved) may be computed, and so on. Such metrics may be provided to TSS clients (e.g., queue administrators) upon request in various embodiments. In at least some embodiments, instead of requiring task requesters to specify share IDs in their requests to schedule tasks, the TSS may derive or determine the share ID of a given task based on one or more properties of the scheduling request in which the task was indicated. In one embodiment, an in-use scheduling policy may be modified, e.g., by adding new share IDs which can be used for high-priority set of tasks. In such a scenario, the modification to the policy may, for example, indicate that resources only be assigned from the associated pool to tasks with the newly-introduced share ID. In embodiments in which the set of task requesters changes over time, TSS clients can easily change the policies to indicate additional share IDs to be used for new task requesters, or to remove share IDs of task requesters who are no longer expected to submit tasks to the FSQs covered by the policies.

In at least some embodiments, as indicated above, a TSS may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include, in addition to a TSS, a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. The resource pools used at a TSS for scheduling requested tasks may comprise some number of VCPUs which can be acquired in units of compute instances in some embodiments—for example a pool may be limited to 100 VCPUs, which can be acquired in the form of 25 4-VCPU instances, 50 2-VCPU instances, 20 4-VCPU instances+20 1-VCPU instances, etc.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a task scheduling service that utilizes share identifiers and fairness parameters to assign resources from dynamically allocated resource pools to tasks may be implemented, according to according to at least some embodiments. As shown, system 100 comprises resources and artifacts of a task scheduling service (TSS) 102 implemented as part of a suite of services of a provider network 101. The suite of services may also include a virtualized computing service (VCS) 161 in the depicted embodiment. The VCS 161 may implement compute instances (CIs) of several categories, such as Class-A CIs 162, Class-B CIs 163, Class-C CIs 164 and the like, which can be acquired by VCS clients to perform desired computations. The categories of compute instances may differ from one another, for example, in properties such as computation capacity, available memory and storage, networking bandwidth limits, and so on. For example, Class-A CIs may each comprise N1 virtualized CPUs (VCPUs) of a particular VCPU type supported by the VCS, Class-B CIs may each comprise N2 VCPUs of the same type, Class-C CIs may each comprise G1 virtualized GPUs (graphics processing units) of a particular VGPU type, and so on.

In at least some embodiments, the tasks whose scheduling is managed by the TSS 102 on behalf of TSS clients may be run on compute instances of the VCS 161. TSS clients may submit task requests to the TSS, specifying task properties such as the resources needed for each task. The resource requirements may be expressed in a variety of units in different embodiments; for example, task requirements may be expressed in terms of VCPUs, VGPUs, compute instances of a particular category, some combination of VCPUs/VGPUs and preferred CI categories, and so on. Each task request may be directed at a queue maintained at the TSS, and each queue may have an associated resource pool definition indicating the maximum number or amount of resources that can be utilized at a time for the tasks directed to that queue. Submitted tasks may be queued if needed, and the TSS may dynamically acquire CIs comprising the needed computational and other resources (e.g., memory, storage etc.) from the VCS based on the resource pool definitions provided by the TSS clients. The TSS may in effect act as a client of the VCS, acquiring and freeing VCS resources on behalf of the TSS's own clients.

The TSS 102 may provide programmatic interfaces 177 which can be used by at least two categories of TSS clients to submit requests related to the scheduling of tasks by the TSS. The programmatic interfaces 177 may, for example, include a web-based console, command-line tools, graphical user interfaces, application programming interfaces (APIs) and the like in different embodiments. One category of TSS clients, referred to as queue administrators, may submit queue and resource pool configuration related requests from client devices 146 (e.g., laptops, desktops, mobile computing devices, etc.) and receive corresponding responses from the TSS; such configuration interactions 178 may typically be fairly infrequent in at least some embodiments. After a queue, an associated resource pool and (at least in some cases) a scheduling policy for the queue has been specified by a queue administrator, the users on whose behalf the queue was set up may begin submitting task scheduling requests 179 directed at the queue from other client devices 146.

Requests submitted to the TSS may be processed initially at a set of client request handlers 108, e.g., to parse the request and ensure that the request is from an authorized user or client. For each request submitted by a client, a client request handler may transmit an internal version of the request to one or more other components of the TSS, such as a scheduling iteration manager (SIM) 106, a resource acquisition manager 107, or a metrics manager 109. The component to which the internal request is directed may attempt to perform the requested operations, and in at least some cases provide a result which can be sent back to the submitter of the request by the client request handler. The components of the TSS, such as SIMs 106, resource acquisition managers 107, metrics managers 109, and client request handlers 108, may each be implemented using some combination of hardware and software at one or more computing devices in the depicted embodiment. In some embodiments, at least some of the TSS components may themselves be implemented using CIs from the VCS.

A queue administrator client of the TSS may use one or more of the programmatic interfaces 177 to set up task queues with associated resource pools and scheduling policies in the embodiment depicted in FIG. 1. For example, for a group of users UG1 (such as data scientists working on a variety of projects for an organization), task queues 130A, each associated with a respective scheduling policy 166A and at least one resource pool with a resource pool definition 135A may be set up. For a different user group UG2, task queues 130B, scheduling policies 166B and resource pool definitions 135B may be specified via programmatic interfaces 177 by a queue administrator client. A given resource pool definition 135 may indicate various properties of a resource pool associated with at least one task queue, such as the maximum number of VCPUs or other resources that can be assigned concurrently to tasks of the queue. For example, a dynamically allocated resource pool DRP 152A defined for UG1 may comprise up to 100 VCPUs, and DRP 152B, also set up for UG1, may comprise up to 64 VGPUs. DRP 152J, associated with at least one of the task queues 130B, may comprise up to 144 concurrently-assigned VCPUs in the scenario depicted in FIG. 1. In addition to the definitions of queues, DRPs, scheduling policies, and the like, user group UG1's scheduling metadata 128A maintained at the TSS may comprise information about the associations or relationships among task queues 130A, resource pool definitions 135A and scheduling policies 166A. User group UG2's scheduling metadata 128B may comprise similar information about task queues 130B, resource pool definitions 135B and scheduling policies 166B.

The TSS may implement at least two types of queues in the depicted embodiment: fair-share queues (FSQs) such as FSQ 151A, FSQ 151B, FSQ 151K and FSQ 151L, as well as FIFO queues such as FIFO queue 157. Tasks submitted to a FIFO queue may be executed in the order in which the requests are received and queued. Tasks directed to an FSQ may be processed based on parameters indicated in a scheduling policy, such as the weights associated with respective share identifiers, a fairness-based reservation parameter, and so on. A task requester may submit tasks to at least one of the queues set up for the user group to which the task requester belongs. In at least some embodiments, part of the metadata stored at the TSS may include, for any given queue, the set of authorized users who are permitted to submit requests to that queue, and/or properties of the tasks or workloads that the authorized users are permitted to submit.

In the embodiment depicted in FIG. 1, a queue administrator may indicate, via programmatic interfaces 177, that in accordance with a particular scheduling policy 166, resources of a particular DRP 152 associated with an FSQ 151 are to be allocated by the TSS to individual tasks directed to the FSQ based at least in part on (a) respective share IDs associated with the individual tasks and (b) a fairness parameter. The share IDs may be explicitly specified in a scheduling policy submitted by the queue administrator in some embodiments; in other embodiments, a methodology or algorithm to dynamically determine the share ID for any submitted task (based on task properties such as the requester's identity) may be provided as part of the scheduling policy. In some embodiments, a queue administrator may use programmatic interfaces 177 to specify, for each authorized task requester, the particular set of share IDs that the task requester is permitted to use, and the TSS may verify that task requests do not violate such permissions.

The scheduling of tasks of a given FSQ or FIFO queue may be performed by scheduling iteration managers 106 in the depicted embodiment. A given scheduling iteration may be initiated based on any of several factors in different embodiments: for example, a scheduling iteration may be started every N seconds in some embodiments. In other embodiments, a new scheduling iteration may be triggered as a result of determining that at least T task scheduling requests have been received for the queue since the previous scheduling iteration, an indication that the total number of tasks queued has met a threshold, a notification that some number of additional resources have been acquired in a DRP associated with the queue by a resource acquisition manager 107, a determination that some number of resources of the DRP have been freed as a result of completion of corresponding tasks, and so on.

In the embodiment depicted in FIG. 1, a particular scheduling iteration for an FSQ 151 may comprise determining, from a current task set comprising at least (a) one or more tasks present in the FSQ and (b) one or more currently-executing tasks which were in the FSQ prior to their execution, a set of currently-in-use share IDs (CSI-set). The scheduling iteration may further comprise computing, using at least the fairness parameter indicated in the scheduling policy of the FSQ, a first fraction f1 of the associated DRP 152 which is to be reserved for allocation, in a subsequent scheduling iteration, to tasks with share IDs which are not members of the CSI-set. In addition, the particular scheduling iteration may also include sorting share IDs of at least a subset of CSI-set based on respective aggregated resource usage metrics corresponding to the share IDs. The metrics may be obtained, for example, from metrics managers 109 configured to keep track of how many resources from the DRPs are used by each task over time, and then aggregating the resource usage information on a per-share-ID basis. The methodology or algorithm to be used to compute the resource usage metrics may be indicated by a queue administrator via programmatic interfaces 177 in some embodiments.

After the share IDs have been sorted based on the aggregated resource usage metrics, in at least some embodiments the particular scheduling iteration may further comprise assigning, to one or more tasks selected from the FSQ based at least in part on a result of the sorting, one or more resources from a second fraction f2 of the DRP. For example, a CI comprising the number of VCPUs or VGPUs indicated in a given selected task's requirements may be assigned to execute the selected task. The second fraction f2, which may be computed based on f1, may represent the un-reserved subset of the DRP that can be assigned in the current scheduling iteration instead of being set aside for later. In some embodiments, respective weights assigned to the different share IDs may also be used to distribute available resources among tasks selected to receive resources in a given scheduling iteration, as discussed below in further detail. In at least one embodiment, a client may assign tasks which have a common share ID respective intra-share priorities, which may be used by the TSS to determine an order in which the tasks are to be assigned resources.

The number or amount of resources present in the DRP 152 in any given scheduling iteration may differ from the number or amount present in the same DRP in another scheduling iteration in the depicted embodiment. Such changes in the DRP population may occur, for example, because new resources have been added to the DRP by resource acquisition managers 107 (while still adhering to the maximum resource constraints indicated in the resource pool definitions) between the iterations or during the iterations, because some resources have been freed from the pool due to a reduction in task requests between the iterations or during the iterations, and so on.

For a FIFO queue 157, a given scheduling iteration may comprise determining, for the task at the head of the FIFO queue, whether sufficient free resources are available in the DRP 152. If sufficient free resources are available, they may be assigned to the task. If sufficient resources are not available for the task at the head of the FIFO queue, none of the tasks may be scheduled, even if there are sufficient resources in the DRP to execute other tasks in the FIFO queue. Each task in the FIFO queue may be handled similarly. While scheduling tasks using FIFO queues may be relatively straightforward, the use of FIFO queues may sometimes lead to potentially "unfair" situations as discussed below in the context of FIG. 2.

For FSQs 151, various types of per-share-ID metrics may be provided on request to a queue administrator or other authorized user via programmatic interfaces 177 by metrics managers 109 in different embodiments. For example, the total number of tasks directed to a given FSQ per share ID may be provided, the total amount of time tasks with a given share ID remained queued prior to being executed using the DRP may be provided, the total number of tasks with a given share ID which were not assigned resources due to the use of the fairness-based reservation parameter (even when resource could have been allocated if resources did not have to be reserved) may be provided, and so on.

Figure 2:
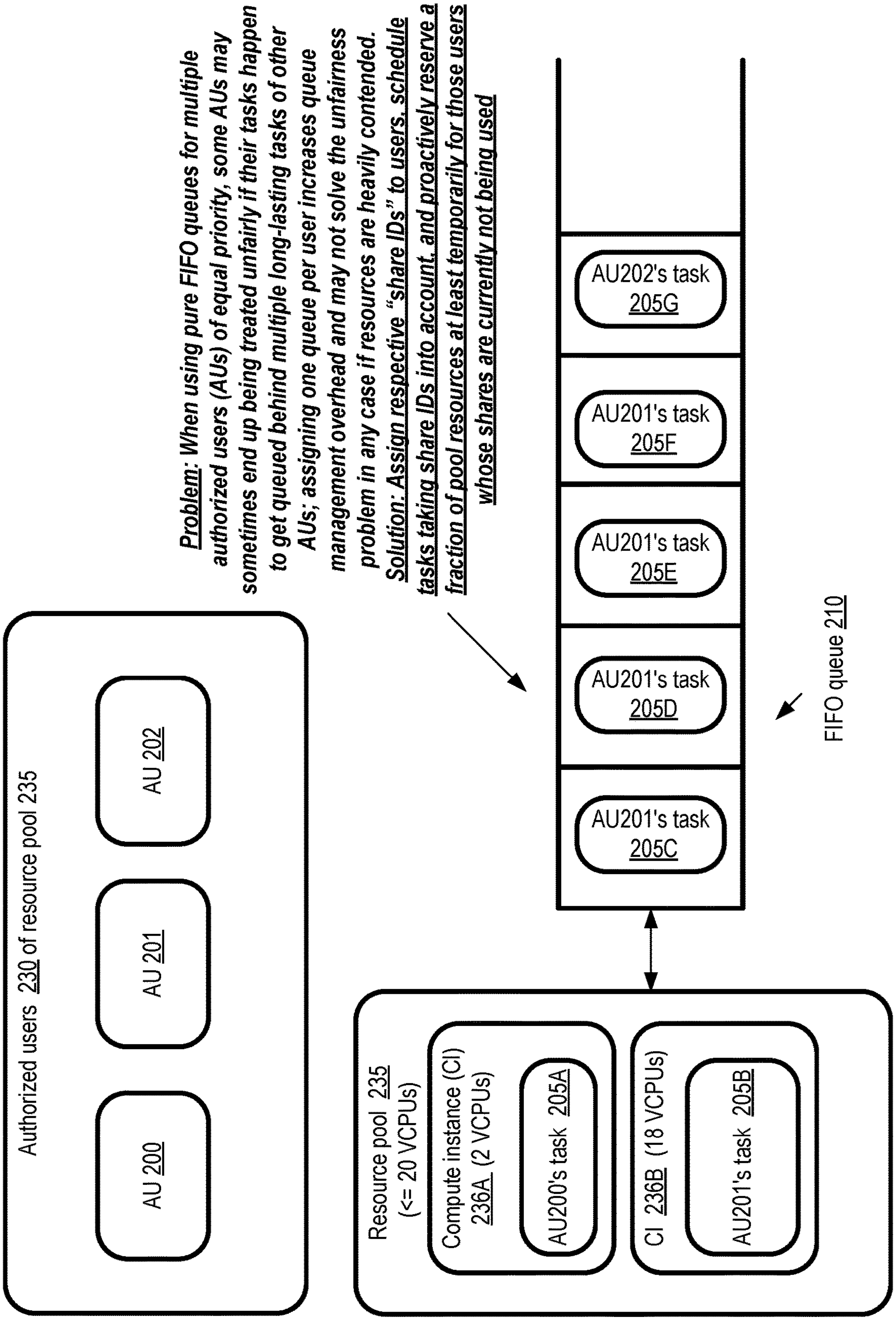
FIG. 2 illustrates an example scenario in which the tasks of some users of a resource pool associated with a first-in-first-out (FIFO) queue may potentially be starved of resources, according to at least some embodiments.

FIG. 2 illustrates an example scenario in which the tasks of some users of a resource pool associated with a first-in-first-out (FIFO) queue may potentially be starved of resources, according to at least some embodiments. Authorized users 230 of resource pool 235 associated with FIFO queue 210 include AU 200, AU 201 and AU 202. The tasks of all three authorized users are assumed to be of equal priority relative to one another. Resource pool can comprise no more than 20 VCPUs at a time, which can be distributed among any desired count of CIs based on task requirements. At the point of time depicted in FIG. 2, resource pool 235 comprises CI 236A (which has 2 VCPUs) and CI 236B (comprising 18 VCPUs), so the maximum limit of 20 VCPUs has been reached for the resource pool 235. CI 236A is being used for AU200's task 205A, while CI 236B is being used for AU201's task 205B.

FIFO queue 210 comprises 5 queued tasks. In FIFO order, these are AU201's task 205C, AU201's task 205D, AU201's task 205E, AU201's task 205F, and AU202's task 205G. Because of the strict FIFO ordering of task executions, AU202's task 205G is not going to be scheduled for execution until (a) at least one of the currently executing tasks 205A and 205B complete and (b) all four of the queued tasks ahead of 205G are also scheduled for execution. Depending on the durations of the tasks ahead of task 205G, it may be a long time before task 205G begins execution, which may seem unfair to AU202 given that all users are assumed to have equal priorities and that AU201 and AU200 have tasks that are already being executed. AU202's tasks may be said to be "starved" of resources in the scenarios such as that shown in FIG. 2. As indicated in FIG. 2, the underlying problem is that when using pure FIFO queues for multiple AUs of equal priority, some AUs may sometimes end up being treated unfairly if their tasks happen to get queued behind multiple long-lasting tasks of other AUs. If, instead of a shared FIFO queue, one queue is established per user (which increases queue management overhead), this may not necessarily resolve the unfairness problem if the resources remain heavily contended. One solution is to use fair share queues of the kind introduced above. In this approach, in various embodiments at least one share ID may be assigned to each AU, tasks may be scheduled taking share IDs into account, and a fraction of the pool's resources may be proactively reserved at least temporarily for those users whose shares are not currently being used.

Figure 3:
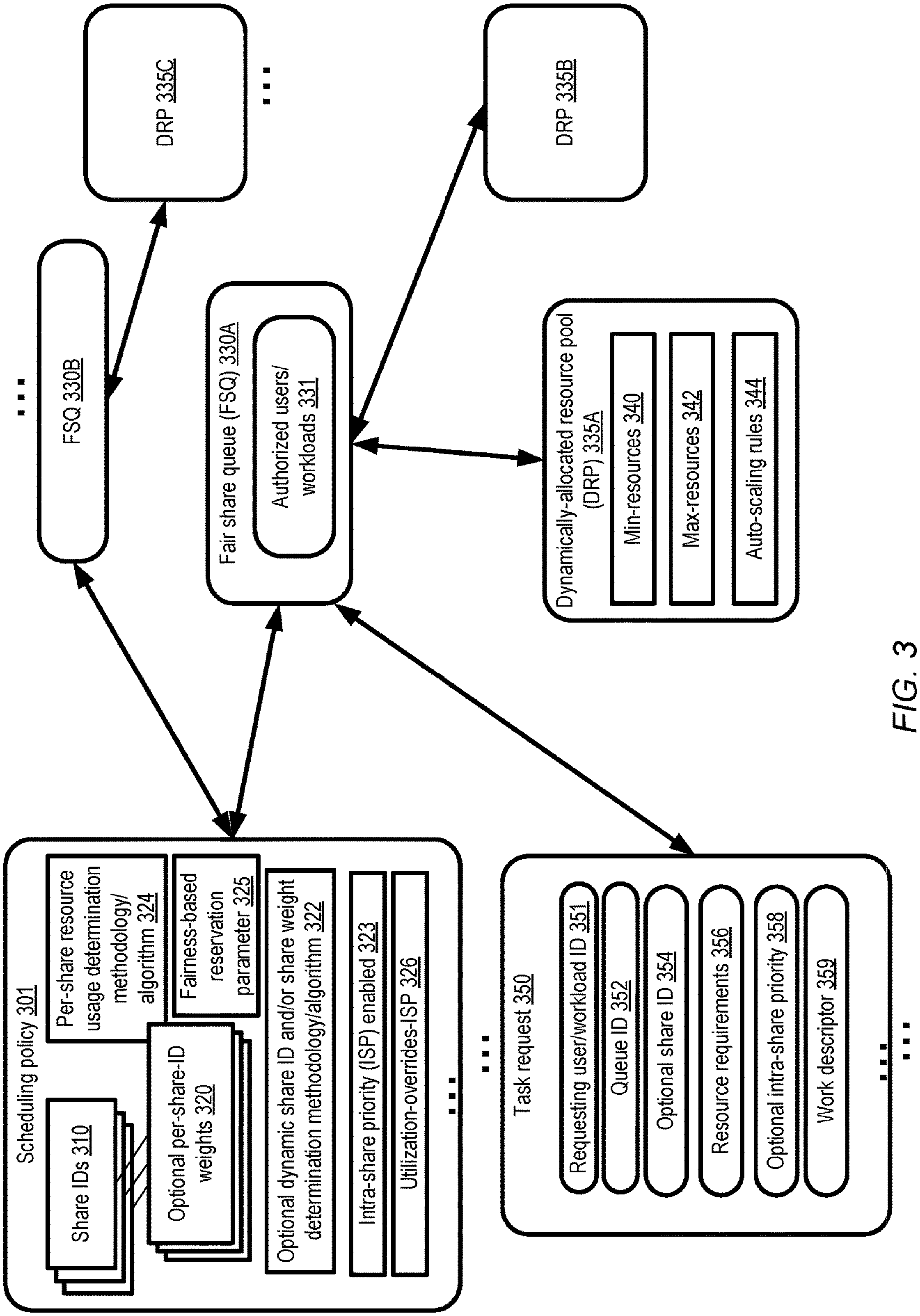
FIG. 3 illustrates example elements of scheduling policies which may be associated with fair-share queues and dynamically-allocated resource pools for processing task requests, according to at least some embodiments.

FIG. 3 illustrates example elements of scheduling policies which may be associated with fair-share queues and dynamically-allocated resource pools for processing task requests, according to at least some embodiments. A given scheduling policy 301 may be created (or in some cases selected from a pre-existing collection of policies) by a TSS client (e.g., a queue administrator) and associated with one or more fair share queues (FSQs) 330, such as FSQ 330A or FSQ 330B. A respective dynamically-allocated resource pool (DRP) may also be associated with one or more FSQs. In the embodiment depicted in FIG. 3, each FSQ may be required by the TSS to have at least one DRP associated with it, and each FSQ may be required exactly one scheduling policy associated with it. In some cases a given FSQ may have multiple DRPs associated with it—for example, FSQ 330A has DRP 335A and DRP 335B associated with it, while FSQ 330B only has DRP 335C associated with it. In some embodiments, multiple FSQs may be associated with a single DRP. In at least one embodiment, a set of authorized users and/or workloads 331 whose tasks are to be managed using a given FSQ may be specified by a TSS client and stored as part of the metadata of the FSQ.

The metadata associated with a DRP 335 may, for example, include a minimum number of resources (min-resources 340), a maximum number of resources (max-resources 342) and/or a set of auto-scaling rules 344. The auto-scaling rules may indicate the conditions which are to trigger dynamic acquisition of additional resources (e.g., by resource acquisition managers similar to those shown in FIG. 1) from a service similar to VCS 161 of FIG. 1 for the DRP, and/or conditions under which previously-acquired resources are to be dynamically released or removed from the DRP. The units in which min-resources and/or max-resources are expressed may include VCPUs, VGPUs, or CIs in various embodiments. In one embodiment, other resource units (such as units for memory, storage and the like) may be used together with (or instead of) computation-related units such as VCPUs or VGPUs. Respective minimum and maximum amounts of memory, storage etc. may thus be specified in the definition of a DRP in such an embodiment, e.g., in addition to minimum and maximum amounts of computation capacity. In some embodiments, if the min-resources parameter is specified, the TSS may keep the specified minimum amount of resources allocated within the DRP even if there are no tasks running or queued.

A scheduling policy 301 may indicate a set of share IDs 310 of the tasks to be managed using the FSQ (or FSQs) 330 with which the scheduling policy is associated in the depicted embodiment. A given share ID 310 may, for example, comprise any desired sequence of characters in some embodiments, thus enabling queue administrators to choose share IDs without onerous restrictions on the format or naming convention. For example, in one scheduling policy, share IDs Project-A, Project-B, and Project-C may be chosen to indicate the particular projects for which tasks are being performed, while in another scheduling policy, share IDs Boston, NYC, and Washington may be used to indicate the particular locations from which task requests are received. Optional per-share-ID weights 320 may be specified in a scheduling policy, indicating the relative fractions of the associated resource pool's maximum resources which can be assigned cumulatively to tasks with each of the share IDs. Any desired non-negative numerical quantities (with no restriction on the sum of all the weights) may be chosen by a TSS client for the weights in some embodiments. For example, consider a scenario in which the share ID Project-A is assigned a weight of 1, Project-B is assigned a weight of 2, and Project-C is assigned a weight of 4. If the maximum number of VCPUs that can be included in the associated DRP is 70, these assigned weights would result in no more than 10 VCPUs being assigned to tasks with share ID Project-A, no more than 20 VCPUs being assigned to Project-B, and no more than 40 VCPUs being assigned to Project-C. Widely varying weights may be chosen in some embodiments by a TSS client for different share IDs—e.g., one weight may be set to 1, another weight may be set to 2, while a third may be set to 10000. Using any desired combination of weights, the distribution of available resources among the shares selected to receive resources may be controlled in various embodiments.

The weights may also be used as one of the factors for selecting the queued tasks to which available resources from a DRP are to be distributed in a given scheduling iteration in some embodiments. Consider an example scenario in which 10 tasks with share ID Project-A are in an FSQ, 10 tasks with share ID Project-B are in the FSQ and 10 tasks with share ID Project-C area also in the FSQ, each task requires 1 VCPU, and the accumulated resource usage metrics of all three shares are identical in a given scheduling iteration. In such a scenario, if 7 VCPUs happen to be available in the DRP, 4 VCPUs may be granted/assigned to respective tasks of share Project-C, 2 VCPUs may be assigned to respective tasks of share Project-B, and 1 VCPU may be assigned to a Project-A task. If no weighs are specified as part of a scheduling policy 301, in some embodiments the TSS may implicitly assign an equal weight (say 1) to all of the share IDs.

In some embodiments, instead of or in addition to providing share IDs 310 and per-share-ID weights 320 explicitly, a TSS client may specify optional share ID and/or share weight determination methodology/algorithm 322 as part of a scheduling policy 301. If the client does not indicate any explicit share IDs 310, the methodology/algorithm may be provided by the client to inform the TSS how to construct share IDs from one or more properties of the task requests in some embodiments. For example, a client may indicate that the user IDs of the task requesters (which are included in the task requests) be used as share IDs. The client may further indicate that unless a special token Tok1 is included in a task request from a particular user, the weight assigned to each of that user's tasks should be set to 1; in contrast, of the special token Tok1 is included in a task request, the weight for the corresponding share ID should be set to 2. Note that at least in some embodiments, all the share IDs that may eventually be used for a given queue may not necessarily be known at the time that the queue is created, and the TSS may have to plan for the submission of task requests with previously-unseen share IDs.

A scheduling policy may include a fairness-based reservation parameter 325 specified by the TSS client in some embodiments, which may be used to proactively set aside at least a fraction of the maximum resource capacity of a DRP for potential assignment in future scheduling iterations as discussed above. Note that the specific share IDs for which the resources are reserved may not be known at the time of resource reservation in at least some embodiments, because the complete set of share IDs for which the queue is going to be used may not necessarily be known or specified in advance. In some embodiments, a per-share resource usage determination methodology/algorithm 324 may be indicated by a client for a scheduling policy 301. This methodology or algorithm may be used to compute the cumulative resource usage for each share ID for whose queued tasks resource assignment decisions are to be made in a given scheduling iteration. Queued tasks may be selected for assignment of available resources in order of increasing accumulated resource usage of their share IDs in at least some embodiments, starting with the share ID with the lowest accumulated resource usage.

In at least one embodiment, a scheduling policy 301 may include an intra-share-priority (ISP) enabled flag 323. If this flag is set, respective priority values may be set for different tasks with a given share ID, and the priority values may be used to determine the order in which the tasks that have that common share ID should be scheduled for execution. As indicated by the name, intra-share-priorities may only be used to make execution order decisions within tasks with the same share ID, and may not be relevant across shares. In one embodiment, a client may indicate, via a utilization-overrides-ISP flag 326, that if a choice is to be made between, on the one hand, strictly enforcing intra-share priorities (which may result in some available resources not being assigned due to the quantities of resources needed by queued high ISP tasks) and on the other hand, assigning some available resources, preference should be given to the assignment of the available resources as this would increase overall utilization of the resource pool. An example of the use of such a utilization-overrides-ISP flag is provided below in the context of FIG. 7. Parameters governing the use of additional types of scheduling considerations may be included in a scheduling policy 301 in some embodiments. For example, one or more parameters related to task preemption may be included in a scheduling policy. If a given task requester indicates that a submitted task can be preempted after it has begun execution, and the scheduling policy supports tasks preemption for tasks that have been designated as preemptible, this may impact the manner in which the proactive reservations are implemented in some embodiments. Preemptible tasks may be allowed to use the resources that would otherwise have been reserved in one such embodiment, because such resources can be freed whenever needed.

A task request 350 submitted by an authorized user 331 may indicate an identifier 351 of the requesting user and/or an identifier of a workload to which the task belongs in some embodiments. The queue ID 352 of the FSQ 330 to which the task is directed may be included in the task request in some embodiments. An optional share ID 354 to be used in accordance with the applicable scheduling policy 301 may be provided in the task request in some embodiments; if the share ID is not provided, the TSS may determine based on the scheduling policy in at least one embodiment. The resource requirements 356 of the task (such as the number of VCPUs, the types of CIs, etc.) may be indicated in the task request in various embodiments. A task request may include an optional intra-share priority 358 in some embodiments. A descriptor 359 of the work to be done as part of the task (e.g., a pointer to an executable image or program to be used to execute the task, a software container to be executed to execute the task, etc.) may be included in a task request in the depicted embodiment. Such a work descriptor may for example be used to perform the desired operations of the task after the task is assigned sufficient resources by the TSS.

Figure 4:
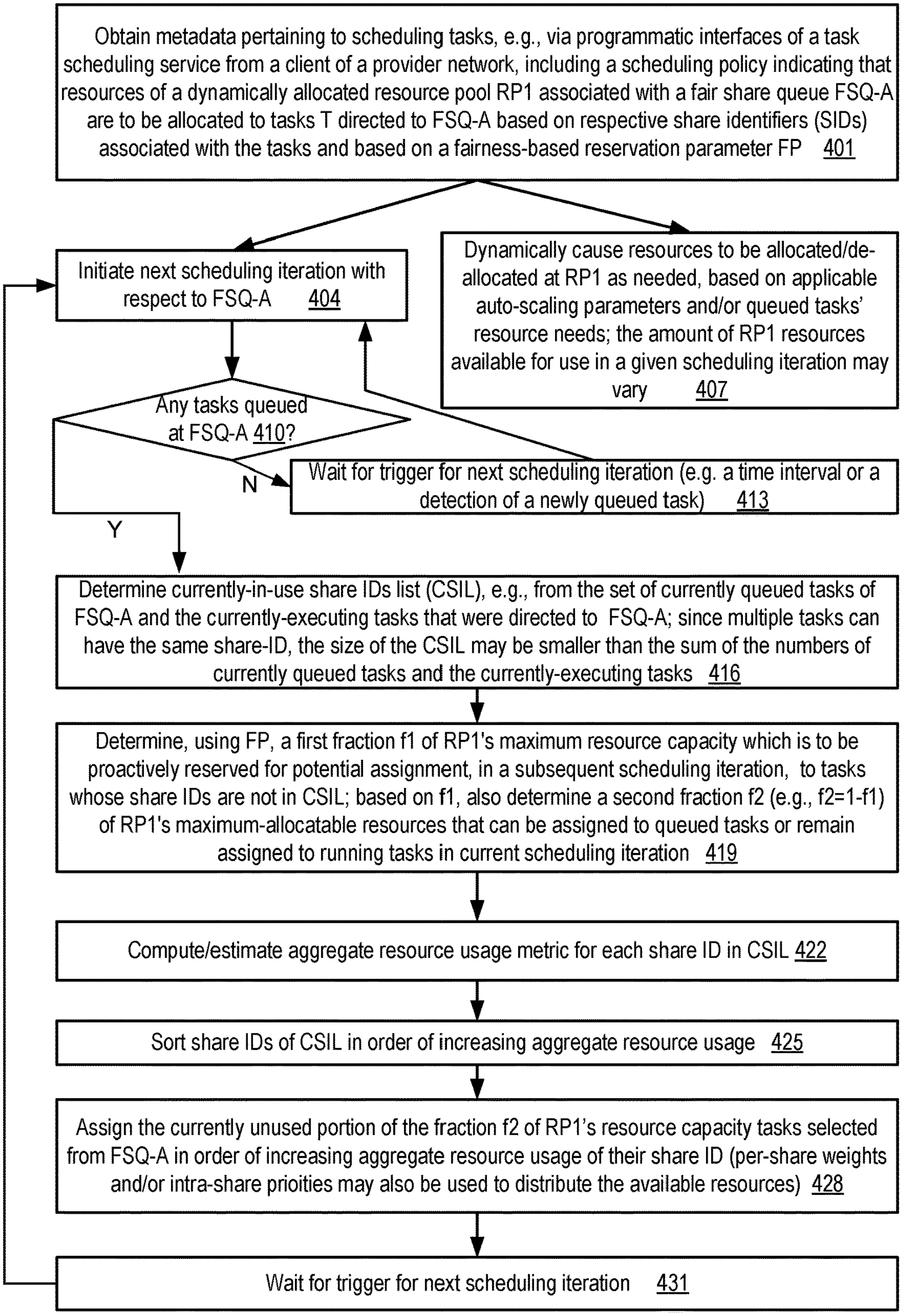
FIG. 4 is a flow diagram illustrating aspects of operations that may be performed to schedule tasks using share identifiers and fairness parameters, according to at least some embodiments.

FIG. 4 is a flow diagram illustrating aspects of operations that may be performed to schedule tasks using share identifiers and fairness parameters, according to at least some embodiments. As shown in element 401, metadata pertaining to the scheduling of tasks on behalf of various clients of a TSS similar in features and functionality to TSS 102 may be received, e.g., via a set of programmatic interfaces implemented by the TSS. The metadata may comprise some or all of the elements shown in FIG. 3 in some embodiments. The received metadata may be stored at one or more repositories maintained by the TSS. As part of the metadata, a client may specify a scheduling policy indicating that resources of a dynamically allocated resource pool RP1 associated with a fair-share queue FSQ-A are to be assigned to tasks T directed to FSQ-A based on respective share identifiers (SIDs) associated with the tasks and based on a fairness-based reservation parameter FP. RP1 may have a maximum resource count setting, such as a maximum VPCUs count (selected for example by the client on whose behalf RP1 was defined or created), indicating an upper limit on the resources that can be allocated from RP1 at a given time. The maximum resource count setting may also be referred to as the maximum resource capacity of RP1.

After the metadata pertaining to FSQ-A is stored, the TSS may initiate a set of scheduling iterations with respect to FSQ-A. Resources may be dynamically allocated or de-allocated (freed) at RP1 as needed (element 407), based for example on auto-scaling parameters associated with RP1 and/or resource requirements of queued tasks, and the amount of RP1 resources available for use (e.g., either to continue executing currently-running tasks, or to assign to queued tasks) in a given scheduling iteration may differ from one iteration to another. In some embodiments, the resource allocation operations may be performed asynchronously with respect to the scheduling iterations; in other embodiments, resources may be allocated or freed at the start or end of a scheduling iteration. In at least one embodiment, one or more resources may be added to RP1 based at least in part on an analysis, performed at the TSS, of resource requirements of one or more tasks directed to FSQ-A. Thus, for example, if requests for many tasks requiring several VCPUs each are received at the TSS at a time when the actual number of VCPUs in RP1 is less than its maximum capacity, the TSS may issue requests to a VCS or other service to add more VCPUs to RP1 while still ensuring that the maximum capacity limit is not exceeded.

The next scheduling iteration with respect to FSQ-A may be initiated in operations corresponding to element 404. If there are no tasks waiting for execution within FSQ-A (as detected in operations corresponding to element 410), the TSS may wait for the trigger for the next scheduling iteration (e.g., an indication that a particular time interval has elapsed since the previous iteration was initiated, or based on an event such as the arrival of one or more task requests) (element 413) and then start the next iteration.

If there are tasks queued in FSQ-A, and if there are resources available in RP1 for assignment for the queued task, operations corresponding to element 416 may be performed in the depicted embodiment. Resources may become available in RP1, for example, if some running tasks complete, or if additional resources are brought online as part of the automated scaling of RP1. In operations corresponding to element 416, a currently-in-use share ID list CSIL may be populated, e.g., by obtaining the respective share IDs of currently-queued tasks at FSQ-A and the share IDs of running tasks that were initially directed to FSQ-A. Note that in the very first scheduling iteration (and in some cases in later scheduling iterations as well) it may sometimes be the case that there are no tasks running that were directed to FSQ-A. In general, because multiple tasks may have the same share ID, the size of the CSIL may in some cases be smaller than the sum of the numbers of currently-executing and currently-queued tasks.

In various embodiments, a first fraction f1 of RP1's maximum resource capacity may be determined using at least the fairness-based reservation parameter FP (element 419). This first fraction f1 may correspond to a subset of RP1's resource capacity which is to be proactively reserved for potential assignment, in a subsequent scheduling iteration, to tasks whose share IDs are not in CSIL. Based on f1, a second fraction f2 (e.g., such that f2=1−f1) may be determined, corresponding to the subset of RP1's resource capacity which can be assigned to queued tasks (or remain assigned to running tasks) in the current scheduling iteration. In one implementation, for example, FP may be specified as a number between 0 and 100, and if the cardinality of CSIL is C, f1 may be set to $(FP/100)^C$. In this example, if there is only one share active (i.e., C=1) and FP is set to 50 in the applicable scheduling policy, f1 would be ½, so 50% of the total capacity of the resource pool may be reserved for tasks with other shares. If there are 2 shares active, f1 would be ¼, so 25% of the capacity of the resource pool may be set aside for non-active shares, and so on. In some embodiments, the fraction of the resource pool's maximum capacity that is available for use (for assignment to queued tasks or for continued use by running tasks) may not be set exactly to 1−f1.

An estimate of an aggregate resource usage metric for each share ID in CSIL may be obtained (element 422) in various embodiments. A number of different techniques may be used to compute such metrics in different embodiments, in some cases based on guidance provided in the scheduling policy applicable to FSQ-A. For example, in one implementation, the total number of VCPUs which were consumed by running tasks with a given share ID SID1 during a specified time period (e.g., one hour) prior to the start of the scheduling iteration may be used as the metric. In another implementation, more recent resource usage may be given greater importance than resources used much earlier than the current scheduling iteration, and a decay factor (indicated, for example, in the scheduling policy) may be applied to reduce the importance of resource usage further back in time. In the latter approach, the aggregate number of VCPUs used in the previous hour for share ID SID1 may be multiplied by 1, the aggregate number of VCPUs used for SID1 in the two hours previous may be multiplied by 0.5, and the aggregate number of VCPUs used for SID1 in the four hours previous to those two hours may be multiplied by 0.25, thus taking resource usage in the past seven hours into account. The three weighted SID1 resource usage values may then be added together to come up with the aggregate usage metric for SID1, and similar decay-based computations may be applied to other SIDs as well.

The share IDs of CSIL may then be sorted in increasing order of resource usage metric values in at least some embodiments (element 425). From the fraction f2 of RP1's resource capacity, the number of resources which are currently not in use for running tasks may be computed, and this unused set of resources may be assigned to tasks selected from FSQ-A in order of increasing aggregate resource usage (starting with the share ID with the lowest aggregate resource usage metric) in the depicted embodiment (element 428). In embodiments in which per-share-ID weights are specified for the different share IDs, and/or intra-share priorities are specified for tasks, those factors may also be taken into account when selecting tasks from FSQ-A and assigning/distributing resources to them. In some cases, if there is sufficient demand and the resource capacity of RP1 has not yet been reached, one or more resources may be added to FSQ-A to reach the fraction f2 and terminate the current scheduling iteration. The TSS may wait for the trigger for initiating the next scheduling iteration (element 431). Operations corresponding to elements 404 onwards may then be conducted for the next scheduling iteration with respect to FSQ-A in various embodiments. It is noted that in various embodiments, some of the operations shown in FIG. 4 may be implemented in a different order than that shown in the figure, or may be performed in parallel rather than sequentially. Additionally, some of the operations shown in FIG. 4 may not be required in one or more implementations.

Figure 5:
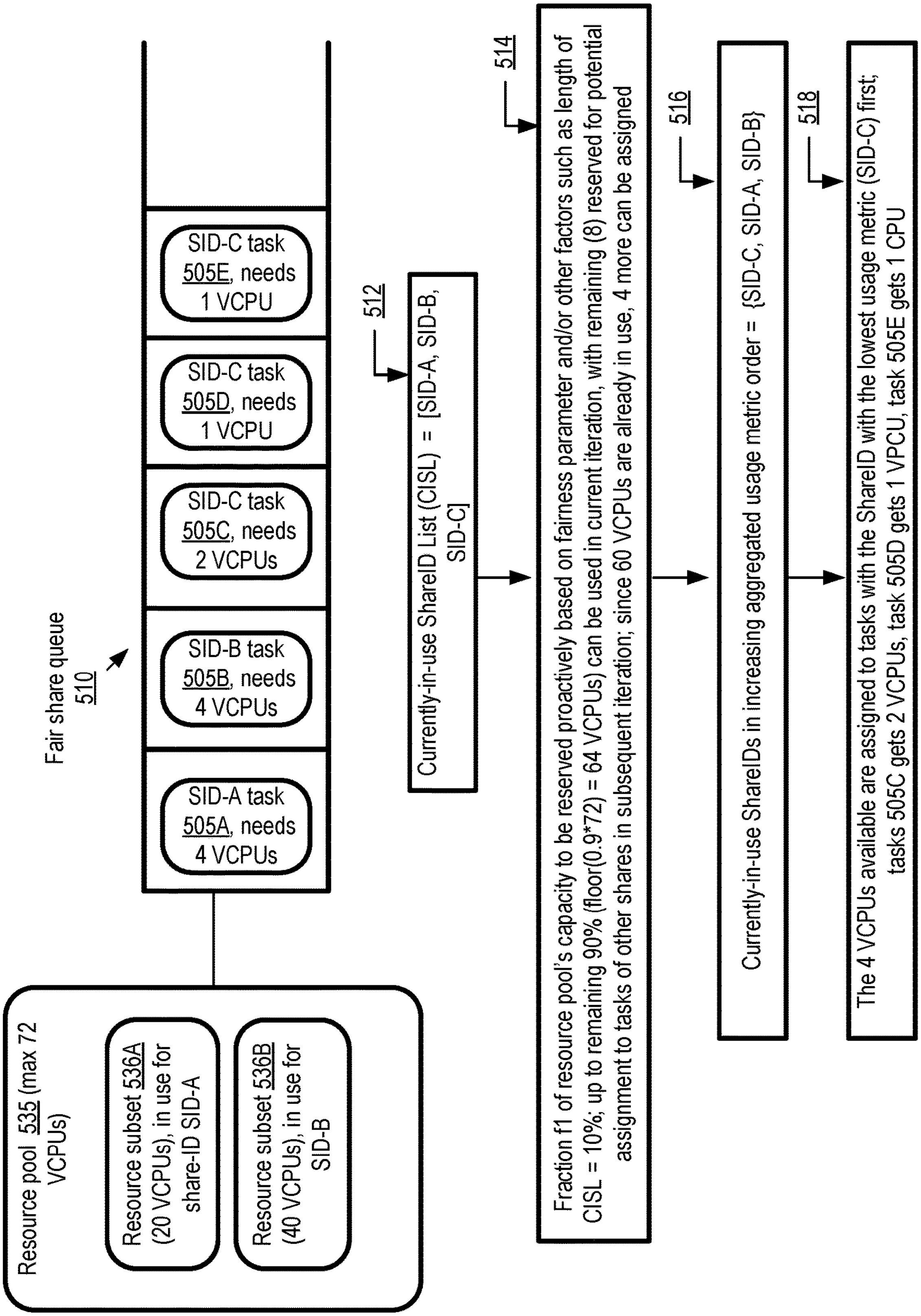
FIG. 5 illustrates an example scenario in which during a given task scheduling iteration, a subset of resources of a dynamically-allocated resource pool may be held in reserve for tasks whose share identifiers are not part of a currently-in-use set of share identifiers, according to at least some embodiments.

FIG. 5 illustrates an example scenario in which during a given task scheduling iteration, a subset of resources of a dynamically-allocated resource pool may be held in reserve for tasks whose share identifiers are not part of a currently-in-use set of share identifiers, according to at least some embodiments. In the example shown, a resource pool 535 has a maximum resource capacity of 72 VCPUs and is associated with a fair share queue 510. Resource subset 536A of resource pool 535, comprising 20 VCPUs, is currently in use for tasks with a share ID SID-A. Resource subset 536B of resource pool 535, comprising 40 VCPUs, is currently in use for tasks with share ID SID-B. To simplify the presentation, all share IDS are assumed to have equal weights (or equivalently, no weights), and intra-share priorities are not used in the example of FIG. 5.

Queue 510 has 5 tasks in it at the time that a scheduling iteration is initiated. In order from the head of the queue to the tail, these are task 505A (share ID SID-A, VCPU requirement=4), task 505B (share ID SID-B, VCPU requirement=4), task 505C (share ID SID-C, VCPU requirement=2), task 505D (share ID SID-C, VCPU requirement=1), and task 505E (share ID SID-C, VCPU requirement=1). It is assumed that a given queued task cannot begin execution until its entire VCPU requirement is satisfied—so, for example, task 505B would need to be assigned 4 VCPUs before it can run.

As part of the scheduling iteration, the currently-in-use share ID list CISL [SID-A, SID-B, SID-C] is created, as indicated in element 512. The fraction f1 of the pool capacity to be reserved proactively based on the fairness parameter in use and/or based on other factors such as the length of CISL is 10%, as indicated in element 514. This means that up to the remaining 90% capacity can be used. The actual number of VCPUs that can be used is computed as floor (0.9*72)) or 64; the remaining 8 VCPUs of the pool's capacity are proactively reserved. (Note that the reserved capacity does not have to consist of resources that have actually been added to the pool—in this example, there are only 60 VCPUs in the pool, all being used). Of these 64, 60 are already in use, so only four VCPUs can actually be assigned a queued task or tasks.

Aggregate resource usage metrics for each of the members of CISL are obtained, and the members of CISL are sorted in order of increasing usage metric as {SID-C, SID-A, SID-B} (element 516). This means that, when allocating the available 4 VCPUs, tasks with share ID SID-C will be preferred over tasks with other SIDs. The 4 VCPUs available for allocation in the current scheduling iteration are assigned as follows as shown in element 518: task 505C gets 2 VCPUs, task 505D gets 1 VCPU and task 505E gets 1 VCPU. If 4 more VCPUs had been available, they may have been assigned to task 505-A of SID-A next (based on the SID sort order shown in element 516). If 8 more VCPUs had been available, task 505B of SID-B may also have been assigned 4 VCPUs in the scheduling iteration.

Figure 6:
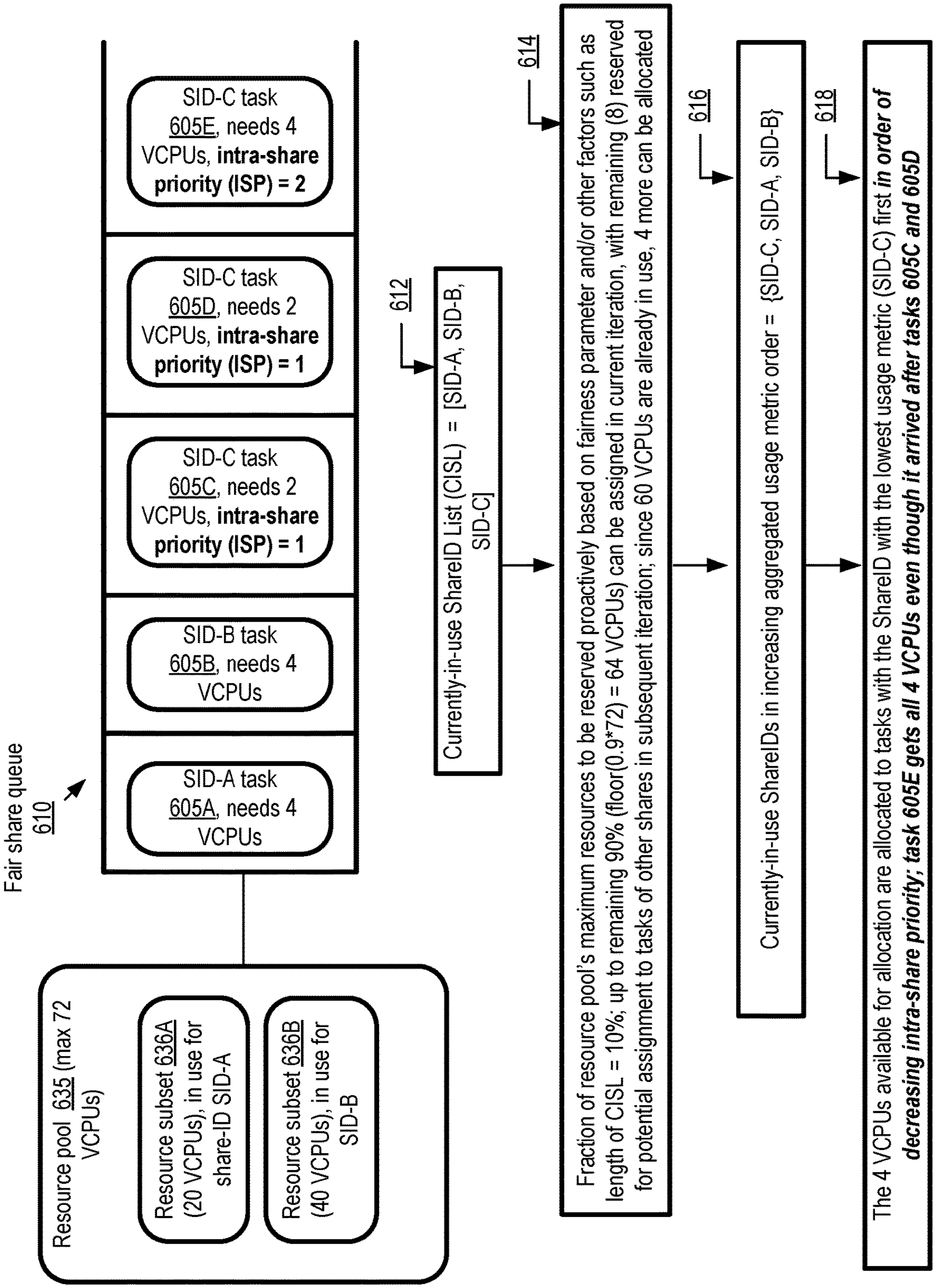
FIG. 6 illustrates an example scenario in which intra-share priority settings may be used in conjunction with share identifiers to schedule tasks, according to at least some embodiments.

FIG. 6 illustrates an example scenario in which intra-share priority settings may be used in conjunction with share identifiers to schedule tasks, according to at least some embodiments. Some aspects of the scenario shown in FIG. 6 are similar to the corresponding aspects of FIG. 5. In the FIG. 6 scenario, a resource pool 635 (similar to resource pool 535 of FIG. 5) has a maximum resource capacity of 72 VCPUs and is associated with a fair share queue 610. Resource subset 636A of resource pool 635, comprising 20 VCPUs, is currently in use for tasks with a share ID SID-A. Resource subset 636B of resource pool 635, comprising 40 VCPUs, is currently in use for tasks with share ID SID-B. To simplify the presentation, all share IDS are assumed to have equal weights (or equivalently, no weights).

Queue 610 has 5 tasks in it at the time that a scheduling iteration is initiated. In order from the head of the queue to the tail, these are task 605A (share ID SID-A, VCPU requirement=4), task 605B (share ID SID-B, VCPU requirement=4), task 605C (share ID SID-C, VCPU requirement=2), task 605D (share ID SID-C, VCPU requirement=2), and task 605E (share ID SID-C, VCPU requirement=4). The three SID-C tasks have been assigned respective intra-share priorities (ISPs), e.g., by their task submitters or by queue administrators: task 605C has an ISP=1, task 605D has an ISP=1, and task 605E has an ISP=2. The queued SID-A and SID-B tasks do not have ISP values assigned. In the scenario depicted in FIG. 6, when assigning available resources to several tasks with the same share ID, tasks with a higher ISP value are assumed to be more important/urgent and are hence to be assigned resources before tasks with a lower ISP. TSS clients may assign any desired ISP values to their tasks in at least some embodiments, as long as they can be ranked relative to one another by the TSS. As such, in some cases, one client may assign small integer ISP values such as 1, 2, 3, etc., while another client may choose ISP values like 1000, 2000, 3000, etc. By default, in some embodiments, the TSS may assume that higher numerical values for ISPs imply higher importance or urgency; if desired, a client may indicate that lower numerical values indicate higher importance/urgency via a setting in a scheduling policy. Some may not have ISP values assigned at all in the depicted embodiment, even if other tasks with the same share ID do have ISP values assigned. In at least one embodiment, a default ISP value (e.g., 1) may be assigned by the TSS to tasks which do not have an ISP value assigned by a client.

As part of a scheduling iteration for queue 610, the currently-in-use share ID list CISL [SID-A, SID-B, SID-C] is created, as indicated in element 612. As in FIG. 5, the fraction f1 of the pool capacity to be reserved proactively based on the fairness parameter in use and/or based on other factors such as the length of CISL is 10%, as indicated in element 614. Based on computations similar to those described above for the scenario covered by FIG. 5, only four VCPUs can actually be assigned a queued task or tasks.

Aggregate resource usage metrics for each of the members of CISL are obtained, and the members of CISL are sorted in increasing usage metric order as {SID-C, SID-A, SID-B} (element 616). This means that, when allocating the available 4 VCPUs, tasks with share ID SID-C will be preferred over tasks with other SIDs. Within the set of tasks with share ID SID-C, tasks will be assigned resources in order of decreasing ISP values. Because the ISP value of task 605E is the highest among the three SID-C tasks, and task 605E requires 4 VCPUs, all 4 available VCPUs are assigned to task 605E. In the embodiment shown in FIG. 6, if the queue contains several tasks with a common share ID and an identical ISP value, available resources may be assigned to them in FIFO order; that is, the arrival order of the tasks may be used to rank tasks with the same ISP value. Accordingly, if 6 VCPUs had been available instead of 4 VCPUs, task 605E would have been assigned 4 VCPUs and task 605C would have been assigned 2 VCPUs. Of course, if 8 VCPUs had been available, all the SID-C tasks would have been assigned the number of VCPUs they require.

The respective resource requirements of queued tasks with a given share ID may differ from one another (as illustrated by the queued tasks of SID-C in the examples of FIG. 5 and FIG. 6). If ISPs are enforced strictly, this can sometimes lead to a situation in which resources of a pool are left idle during a scheduling iteration because of the resource count requirement of a high-ISP task, even though the pool's resources could be used by other tasks with the same share ID. Some clients may wish to avoid such scenarios in which pool resources are underutilized due to ISP considerations, and may accordingly utilize the utilization-overrides-ISP scheduling policy setting discussed in FIG. 3.

Figure 7:
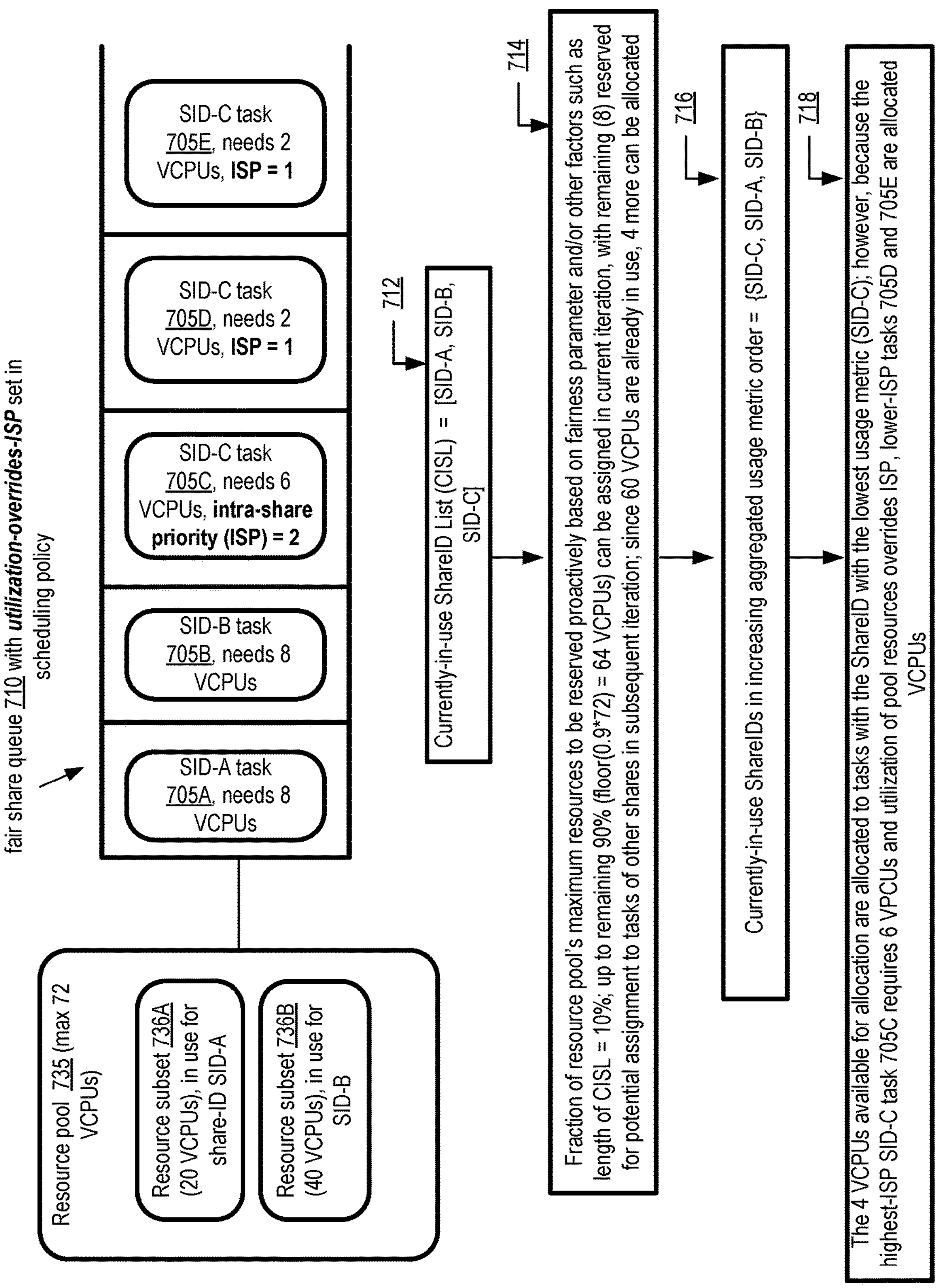
FIG. 7 illustrates an example scenario in which intra-share priority settings may potentially be overridden when scheduling tasks, according to at least some embodiments.

FIG. 7 illustrates an example scenario in which intra-share priority settings may potentially be overridden when scheduling tasks, according to at least some embodiments. Some aspects of the scenario shown in FIG. 7 are similar to the corresponding aspects of FIG. 5 and FIG. 6. In the FIG. 7 scenario, a resource pool 735 (similar to resource pool 535 of FIG. 5) has a maximum resource capacity of 72 VCPUs and is associated with a fair share queue 710 which has the utilization-overrides-ISP flag set. Resource subset 736A of resource pool 735, comprising 20 VCPUs, is currently in use for tasks with a share ID SID-A. Resource subset 736B of resource pool 735, comprising 40 VCPUs, is currently in use for tasks with share ID SID-B. To simplify the presentation, all share IDS are assumed to have equal weights (or equivalently, no weights).

Queue 710 has 5 tasks in it at the time that a scheduling iteration is initiated. In order from the head of the queue to the tail, these are task 705A (share ID SID-A, VCPU requirement=8), task 705B (share ID SID-B, VCPU requirement=8), task 705C (share ID SID-C, VCPU requirement=6, ISP=2), task 705D (share ID SID-C, VCPU requirement=2, ISP=1), and task 705E (share ID SID-C, VCPU requirement=42, ISP=1).

As part of a scheduling iteration for queue 710, the currently-in-use share ID list CISL [SID-A, SID-B, SID-C] is created, as indicated in element 712. As in FIG. 5 and FIG. 6, the fraction f1 of the pool capacity to be reserved proactively based on the fairness parameter in use and/or based on other factors such as the length of CISL is 10%, as indicated in element 714. Based on computations similar to those described above for the scenario covered by FIG. 5, only four VCPUs can actually be assigned a queued task or tasks.

Aggregate resource usage metrics for each of the members of CISL are obtained, and the members of CISL are sorted in increasing usage metric order as {SID-C, SID-A, SID-B} (element 716). This again means that, when allocating the available 4 VCPUs, tasks with share ID SID-C will be preferred over tasks with other SIDs. Within the set of tasks with share ID SID-C, tasks would be assigned resources strictly in order of decreasing ISP values if the utilization-overrides-ISP flag were not set. Because the ISP value of task 705C is the highest, and the resource requirement of task 705C is 6 VCPUs while only 4 VCPUs are available, this would mean that the 4 VCPUs would have remained idle if the utilization-overrides-ISP flag were not set. However, because the utilization-overrides-ISP flag is set for queue 710, the TSS is permitted to try to assign resources to lower-ISP tasks with share ID SID-C in the depicted embodiment. Task 705D is therefore assigned 2 VCPUs, and task 705E is assigned the remaining 2 VCPUs (element 718). The higher ISP value of task 705D is overridden by concerns about utilizing idle pool resources. In one embodiment, a TSS client may also indicate other types of overrides to be implemented—for example, a utilization-overrides-ShareID flag may be set, in which case if the tasks of the share ID which was selected based on low aggregate usage metric considerations are unable to use some pool resources, tasks with higher aggregate usage metrics may be assigned resources instead.

Figure 8:
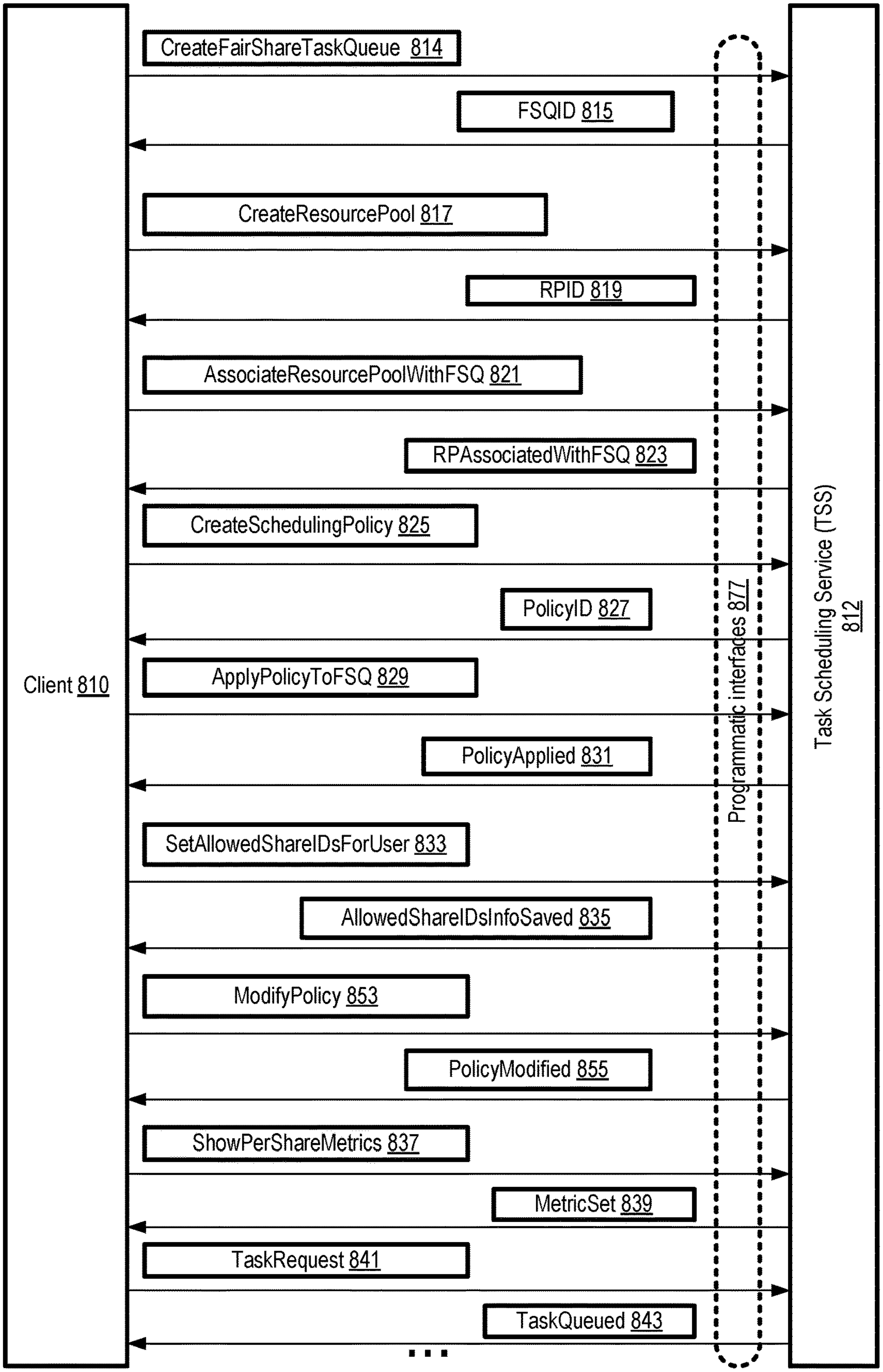
FIG. 8 illustrates example programmatic interactions between clients and a task scheduling service, according to at least some embodiments.

FIG. 8 illustrates example programmatic interactions between clients and a task scheduling service, according to at least some embodiments. ATSS 812, similar in features and functionality to TSS 102 of FIG. 1, may implement a set of programmatic interfaces 877 such as one or more web-based consoles, command-line tools, graphical user interfaces, APIs and the like. As mentioned earlier, at least two types of requests may be transmitted to a TSS—queue administration-related requests, and requests to run tasks.

A client 810 may request the establishment of a fair share queue by submitting a CreateFairShareQueue request 814 in the depicted embodiment. The request may indicate values for various queue properties, such as a queue name, the set of authorized users and/or workloads whose tasks are to be implemented using the queue and so on. In some embodiments, the set of authorized users may be inferred by the TSS instead of being explicitly indicated by the client. For example, a provider-network client account may have been set up for an organization for which the queue is to be created, and the request 814 may indicate the client account. Respective user accounts may then be set up for task requesters, with all the user accounts being tied to or associated with the same client account. By default, the TSS may assume that any user associated with the client account for which the queue is created may be authorized to use the queue. Metadata indicating that the queue has been created may be stored at the TSS, and a FSQID message 815 indicating an identifier generated at the TSS for the queue may be provided to the client in the depicted embodiment.

A client may submit a CreateResourcePool request 817 to establish a resource pool to be used for one or more queues in the depicted embodiment, and then submit one or more AssociateResourcePoolWithFSQ requests 821 to establish a relationship between a specified pool and a fair share queue. Various properties of the resource pool (such as the properties min-resources, max-resources and auto-scaling rules discussed in the context of FIG. 3) may be specified in the CreateResourcePool request in the depicted embodiment. In some embodiments, in addition to or instead of using dynamically-allocated resource pools, a client may request that a resource pool whose resources are static (e.g., acquired and initialized at the time the pool is created) be set up. An identifier for the created resource pool may be sent to the client in an RPID message 819 in the depicted embodiment. An RPAssociatedWithFSQ message 823 may be sent to the client to indicate that a record of the association of a resource pool with a queue has been stored as part of the metadata maintained at the TSS.

A CreateSchedulingPolicy request 825 may be directed to the TSS by a client via the programmatic interfaces 877 in the embodiment depicted in FIG. 8, specifying some or all of the properties of a scheduling policy that were discussed in the context of FIG. 3. An identifier may be assigned to the newly-created policy with the specified properties at the TSS, and provided to the client in a PolicyID message 827. The scheduling policy may be stored as part of the metadata maintained at the TSS for the client's account in some embodiments.

As mentioned earlier, in some embodiments a given scheduling policy may be used for multiple queues. An ApplyPolicyToFSQ request 829, specifying the identifier of a fair share queue and the identifier of the policy to be applied for that queue may be submitted by a client 810 in some embodiments. In response, the TSS may store metadata indicating that the policy applies to the queue, and send a Policy Applied message 831 to the client.

A client (e.g., a queue administrator of the organization form which an FSQ was set up) may submit a SetAllowedShareIDsForUser request 833 to indicate to the TSS that a specified user is only allowed to submit task requests with a share ID that belongs to a set of share IDs indicated in the request. When the user later submits a task request, the TSS may verify that the share ID of the task belongs to the set of share IDs indicated in the SetAllowedShareIDsForUser request 833, and the task may be rejected if it has a share ID that is not a member of that set. An AllowedShareIDsInfoSaved message 835 may be sent to the client 810 after the information about the share IDs permitted for the user is saved at the TSS in the depicted embodiment.

A ModifyPolicy request 853 may be sent by the client 810 to change one or more of a policy's parameters in the depicted embodiment. Any of the policy parameters shown in FIG. 3 may be modified by the client, such as the set of share IDs allowed, the weights assigned to different share IDs, the details of how resource usage is to be computed for different shares, and so on. In response to the request 853, the metadata stored for the policy may be modified at the TSS and a PolicyModified message 855 may be sent to the client.

The TSS may collect metrics pertaining to individual shares for the various share IDs used at a queue in various embodiments, such as the total amount of resource consumed by each share, the average amount of time tasks of the share remained in the queue, the average amount of time tasks of the share were prevented from beginning execution due to a proactive reservation, and so on. A client may submit a ShowPerShareMetrics request 837 to view such metrics in the depicted embodiment. The metrics may be provided via one or more MetricSet messages 839.

Clients may submit TaskRequest messages 841 indicating properties of a task (such as the elements of task request 350 of FIG. 3) which is directed to a specified queue. The task may be inserted into the specified queue after the TSS conducts some verification checks (e.g., to make sure that a share ID indicated in the task request is valid for the queue) and insert the task into the specified queue if the verification succeeds. A TaskQueued message 843 may be sent to the client in some embodiments to indicate that the task has been received and processed at the TSS. Note that it may sometimes be the case that the task does not have to be queued at all, if sufficient resources are available. In such cases, the client may be sent a TaskInitiated message indicating that the task has begun execution, instead of a TaskQueued message. In some embodiments, a client may be notified when a queued task is assigned resources and begins its execution. Clients may be notified when tasks submitted by the client complete their execution in at least some embodiments, e.g., via a TaskExecuted message. It is noted that programmatic interactions other than those shown in FIG. 8, pertaining to the manner in which tasks are to be assigned resources, may be supported by a TSS, while some of the interactions shown in FIG. 8 may not be supported in at least one embodiment. For example, various interactions pertaining to standard or traditional FIFO queues may be supported at a TSS and are not shown in FIG. 8.

Figure 9:
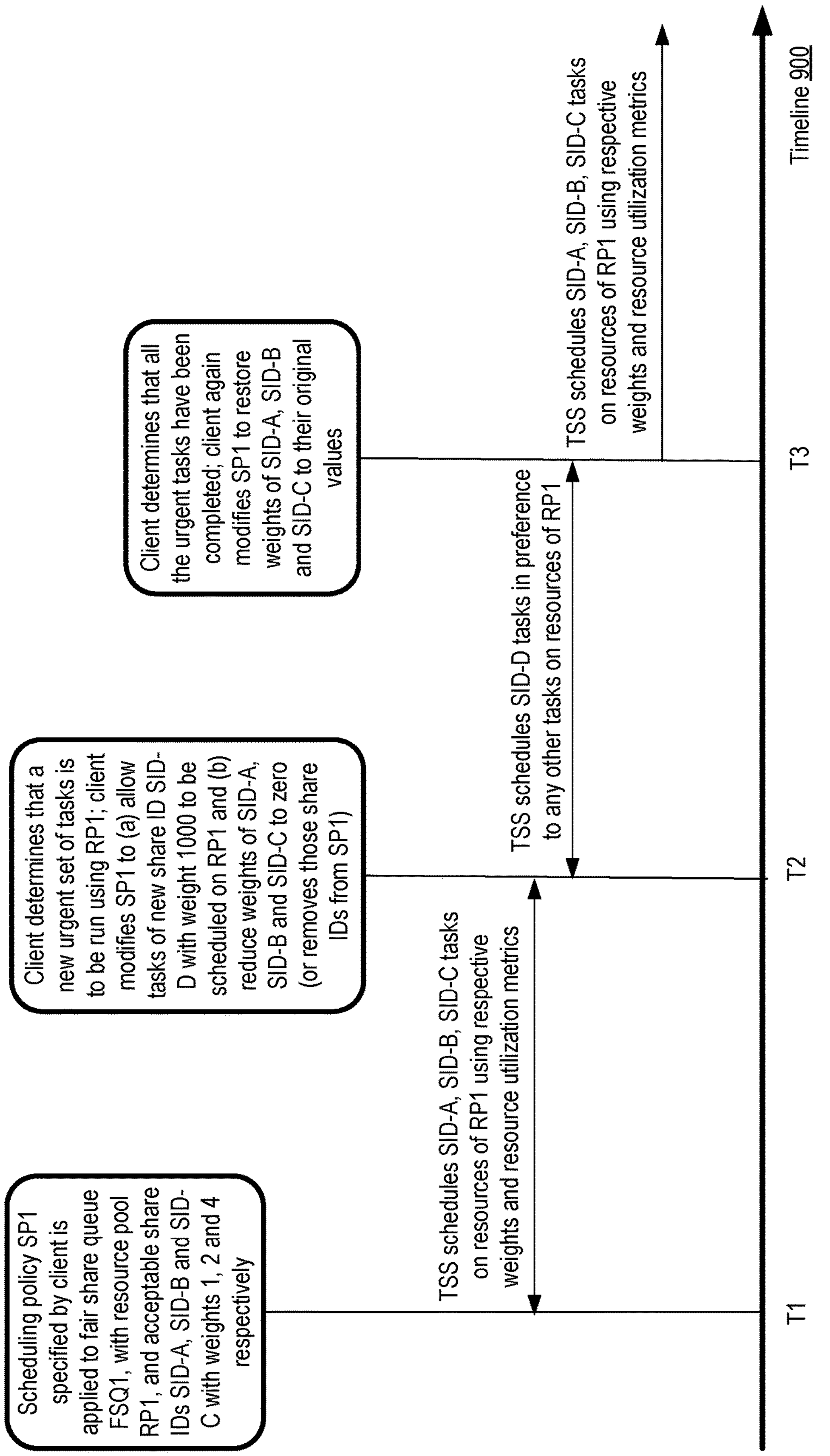
FIG. 9 illustrates an example timeline of events in which an in-use scheduling policy may be modified to handle a set of urgent tasks, according to at least some embodiments.

FIG. 9 illustrates an example timeline of events in which an in-use scheduling policy may be modified to handle a set of urgent tasks, according to at least some embodiments. At a time T1 along timeline 900, a scheduling policy SP1 specified by a client is applied to a fair share queue FSQ1 associated with a resource pool RP1. In the policy the client indicates that tasks with share identifiers SID-A, SID-B and SID-C are expected to be directed to FSQ1, and that the weights assigned to these three shares are 1, 2 and 4 respectively.

Between T1 and T2, the TSS schedules tasks belonging to shares with IDs SID-A, SID-B and SID-C on the resources of RP1 (which may be dynamically allocated) using the respective weights indicated and aggregated resource utilization metrics collected for the shares, in the manner described earlier.

At time T2, the client determines that a new and urgent set of tasks is to be run using RP1. The client modifies SP1 (e.g., using a ModifyPolicy request of the kind shown in FIG. 8) to (a) allow tasks with a new share ID, SID-D with weight 1000 to be scheduled on RP1 and (b) reduce weights of SID-A, SID-B and SID-C, e.g., to zero, so that as long as SID-D tasks are waiting for resources of RP1, tasks belonging to the other three SIDs are not scheduled ahead of SID-D tasks. If desired, the client may simply eliminate the original three SIDs from SP1. Between T2 and T3, the TSS schedules SID-D tasks in preference to any other tasks on resources of RP1.

At time T3 along timeline 900, the client determines that all the urgent SID-D tasks have been completed. The client again modifies SP1, restoring the weights of SID-A, SID-B and SID-C shares to their original weights (or any desired weights). Subsequently, the TSS again schedules SID-A, SID-B and SID-C using RP1 resources, using the three shares' weights and aggregate resource usage metrics to make scheduling decisions in each scheduling iteration in the depicted embodiment. FIG. 9 illustrates that clients can easily dynamically adjust scheduling policies to handle changing workloads in at least some embodiments.

Figure 10:
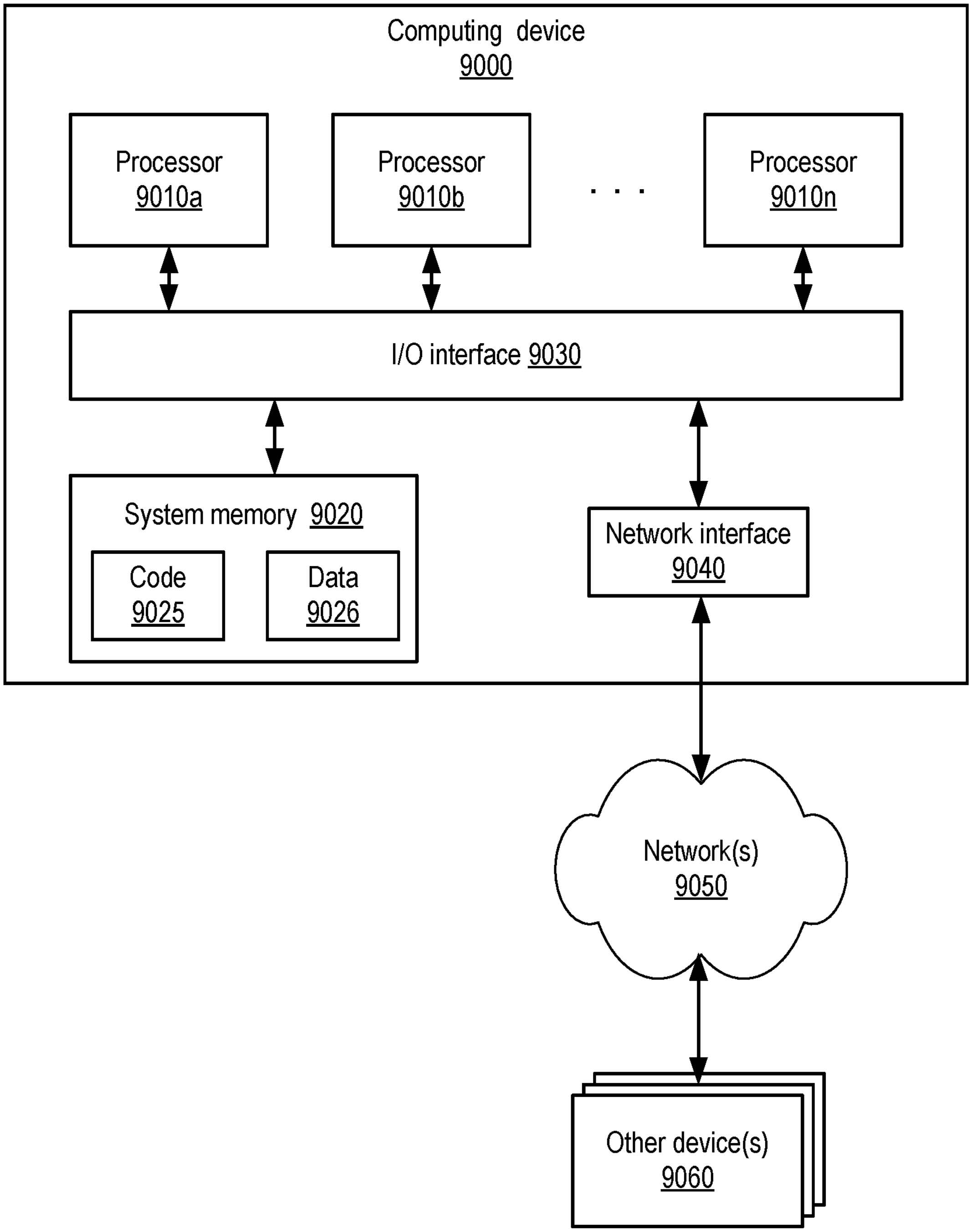
FIG. 10 is a block diagram illustrating an example computing device that may be used in at least some embodiments.

In at least some embodiments, a server that implements the types of techniques described herein (e.g., various functions of a TSS, a VCS or other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices includes instructions that upon execution on the one or more computing devices cause the one or more computing devices to:

acquire, from a computing service of a cloud provider network, a dynamically-allocated resource pool to execute a queue of tasks, wherein an amount of resources present in the dynamically-allocated resource pool changes over successive scheduling iterations of a task scheduling service of the cloud provider network;

obtain an indication, via one or more programmatic interfaces, from a client of the task scheduling service, that the resources of the dynamically-allocated resource pool are to be assigned to individual tasks of the queue based at least in part on (a) respective share identifiers associated with the individual tasks and (b) a fairness-based reservation parameter; and conduct, at the task scheduling service, a plurality of scheduling iterations with respect to the queue, wherein a particular scheduling iteration of the plurality of scheduling iterations comprises at least:

determining a set of currently-in-use share identifiers from a current task set comprising (a) one or more tasks present in the queue and (b) one or more currently-executing tasks which were in the queue prior to their execution, wherein a number of members of the set of currently-in-use share identifiers is smaller than a number of members of the current task set;

computing, using at least the fairness-based reservation parameter, a first fraction of a capacity of the dynamically-allocated resource pool to be reserved for allocation, in a subsequent scheduling iteration, to tasks with share identifiers which are not members of the set of currently-in-use share identifiers;

sorting share identifiers of at least a subset of the current task set based at least in part on respective aggregated resource usage metrics corresponding to the share identifiers;

assigning, to one or more tasks selected from the queue based at least in part on a result of the sorting, one or more resources from a second fraction of the capacity of the dynamically-allocated resource pool, wherein the second fraction is determined at least in part from the first fraction; and causing the computing service to execute the one or more tasks selected from the queue on the one or more resources of the second fraction according to the assigning, wherein use of the at least the fairness-based reservation parameter in the computing of the first fraction of a capacity reduces a likelihood that the one or more tasks selected from the queue are starved of resources.

2. The system as recited in claim 1, wherein the one or more computing devices includes further instructions that upon execution on the one or more computing devices further cause the one or more computing devices to:

obtain, at the task scheduling service prior to the particular scheduling iteration, via a programmatic interface, an indication of a respective weight assigned to one or more share identifiers, wherein assigning the one or more resources further comprises:

distributing, among the one or more tasks selected from the queue, the one or more resources based at least in part on respective weights assigned to share identifiers of the one or more tasks.

3. The system as recited in claim 1, wherein the one or more computing devices includes further instructions that upon execution on the one or more computing devices further cause the one or more computing devices to:

obtain, at the task scheduling service prior to the particular scheduling iteration, via a programmatic interface, a first intra-share priority of a first task, and a second intra-share priority of a second task, wherein the first task has a first share identifier, wherein the second task has the first share identifier, and wherein the particular scheduling iteration further comprises:

based at least in part on determining that queued tasks with the first share identifier are to be assigned resources, selecting the first task and the second task from the queue for assignment of resources from the dynamically-allocated resource pool, wherein one or more queued tasks with a second share identifier are not selected for assignment of resources during the particular scheduling iteration; and based at least in part on a comparison of the first intra-share priority with the second intra-share priority, determining an order in which resources of the dynamically-allocated resource pool are assigned to the first task relative to the second task.

4. The system as recited in claim 1, wherein the one or more computing devices includes further instructions that upon execution on the one or more computing devices further cause the one or more computing devices to:

obtain, at the task scheduling service prior to the particular scheduling iteration, via a programmatic interface, an indication of a methodology to be used to compute the aggregate resource usage metrics, wherein aggregate resource usage metrics utilized for said sorting are obtained using the methodology.

5. The system as recited in claim 1, wherein the one or more computing devices includes further instructions that upon execution on the one or more computing devices further cause the one or more computing devices to:

cause one or more resources to be added to the dynamically-allocated resource pool based at least in part on an analysis of resource requirements of one or more tasks directed to the queue.

6. A computer-implemented method, comprising:

acquiring, at a task scheduling service of a cloud provider network from a computing service of the cloud provider network, a resource pool of resources to execute a queue of tasks, wherein the resource pool includes dynamically allocated computing resources and an amount of resources present in the resource pool changes over successive scheduling iterations of the task scheduling service;

conducting, at the task scheduling service, a plurality of scheduling iterations with respect to the queue of tasks and the resource pool, wherein individual tasks to be executed using the resource pool have respective share identifiers corresponding to respective portions of a capacity of the resource pool, wherein a particular scheduling iteration of the plurality of scheduling iterations comprises at least:

identifying, by the task scheduling service and from a current task set comprising at least (a) one or more tasks present in the queue and (b) one or more currently-executing tasks which were in the queue prior to their execution, a set of currently-in-use share identifiers;

determining, by the task scheduling service and using at least a fairness-based reservation parameter, a first subset of the resource pool to be reserved for assignment to tasks with share identifiers which are not members of the set of currently-in-use share identifiers;

assigning, by the task scheduling service and to one or more tasks selected from the queue based at least in part on their respective share identifiers, one or more resources from a second subset of the resource pool, wherein the second subset is determined at least in part from the first subset; and causing, by the task scheduling service, the computing service to execute the one or more tasks selected from the queue on the one or more resources of the second subset according to the assigning, wherein use of the at least a fairness-based reservation parameter in the determining of the first subset of the resource pool to be reserved for assignment to tasks with share identifiers which are not members of the set of currently-in-use share identifiers reduces a likelihood that the one or more tasks selected from the queue are starved of resources.

7. The computer-implemented method as recited in claim 6, wherein the particular scheduling iteration further comprises:

sorting share identifiers of at least a subset of the current task set based at least in part on respective resource usage metrics corresponding to the share identifiers; and selecting, from the queue, based at least in part on a result of the sorting, the one or more tasks to which one or more resources from the second subset of the resource pool are assigned.

8. The computer-implemented method as recited in claim 6, further comprising:

obtaining, at the task scheduling service prior to the particular scheduling iteration, via a programmatic interface, an indication of a respective weight assigned to one or more share identifiers, wherein assigning the one or more resources further comprises:

distributing, among the one or more tasks selected from the queue, the one or more resources based at least in part on respective weights assigned to share identifiers of the one or more tasks.

9. The computer-implemented method as recited in claim 6, further comprising:

obtaining, at the task scheduling service prior to the particular scheduling iteration, via a programmatic interface, an indication of (a) a weight assignment methodology and (b) a matching methodology to be used to determine share identifiers to which weights are to be assigned according to the weight assignment methodology, wherein assigning the one or more resources further comprises:

assigning a resource to a particular task based at least in part on a particular weight assigned to a share identifier of the particular task, wherein the share identifier to which the particular weight is to be assigned is determined using the matching methodology, and wherein the particular weight is determined using the weight assignment methodology.

10. The computer-implemented method as recited in claim 6, further comprising:

obtaining, at the task scheduling service prior to the particular scheduling iteration, via a programmatic interface, a first intra-share priority of a first task, and a second intra-share priority of a second task, wherein the first task has a first share identifier, and the second task has the first share identifier, wherein the particular scheduling iteration further comprises:

based at least in part on determining that queued tasks with the first share identifier are to be assigned resources, selecting the first task and the second task from the queue for assignment of resources from the resource pool, wherein one or more queued tasks with a second share identifier are not selected for assignment of resources during the particular scheduling iteration; and based at least in part on a comparison of the first intra-share priority to the second intra-share priority, determining an order in which resources of the resource pool are assigned to the first task relative to the second task.

11. The computer-implemented method as recited in claim 6, wherein individual ones of the tasks scheduled by the task scheduling service have a respective requester identifier, the computer-implemented method further comprising:

obtaining, at the task scheduling service prior to the particular scheduling iteration, via a programmatic interface, an indication of a group of one or more share identifiers that a particular task requester is permitted to assign to a task submitted to the queue; and verifying, by the task scheduling service, that a share identifier of a task submitted to the queue by the particular task requester belongs to the group of one or more share identifiers.

12. The computer-implemented method as recited in claim 6, further comprising:

obtaining, at the task scheduling service prior to the particular scheduling iteration, via a programmatic interface, the fairness-based reservation parameter.

13. The computer-implemented method as recited in claim 6, further comprising:

obtaining, at the task scheduling service prior to the particular scheduling iteration, via a programmatic interface, an indication of a methodology to be used to compute a per-share-identifier resource usage metric, wherein the particular scheduling iteration further comprises:

determining, using the methodology, a respective per-share-identifier resource usage metric for share identifiers of at least a subset of the current task set; and selecting from the queue, based at least in part on their respective per-share-identifier resource usage metrics, the one or more tasks to which one or more resources from the second subset of the resource pool are assigned.

14. The computer-implemented method as recited in claim 6, further comprising:

providing, by the task scheduling service via a programmatic interface, per share metrics comprising (a) values of one or more metrics collected with respect to tasks with a first share identifier and (b) values of the one or more metrics collected with respect to tasks with a second share identifier.

15. The computer-implemented method as recited in claim 6, further comprising:

assigning, by the task scheduling service based at least in part on one or more properties of a task scheduling request received via a programmatic interface, a share identifier to a task indicated in the task scheduling request.

16. A non-transitory computer-accessible storage medium storing program instructions that when executed on a processor cause the processor to:

acquire, at a task scheduling service of a cloud provider network from a computing service of the cloud provider network, a resource pool of resources to execute a queue of tasks, wherein the resource pool includes dynamically allocated computing resources and an amount of resources in the resource pool changes over successive scheduling iterations of the task scheduling service;

conduct, at the task scheduling service, a plurality of scheduling iterations with respect to the queue of tasks and the resource pool, wherein individual tasks to be executed using the resource pool have respective share identifiers corresponding to respective portions of a capacity of the resource pool, wherein a particular scheduling iteration of the plurality of scheduling iterations comprises at least:

identifying, by the task scheduling service and from a current task set comprising at least (a) one or more tasks present in the queue and (b) one or more currently-executing tasks which were in the queue prior to their execution, a set of currently-in-use share identifiers;

determining, by the task scheduling service and using at least a fairness-based reservation parameter, a first subset of the resource pool to be reserved for assignment to tasks with share identifiers which are not members of the set of currently-in-use share identifiers;

assigning, by the task scheduling service and to one or more tasks selected from the queue based at least in part on their respective share identifiers, one or more resources from a second subset of the resource pool, wherein the second subset is determined at least in part from the first subset; and causing, by the task scheduling service, the computing service to execute the one or more tasks selected from the queue on the one or more resources of the second subset according to the assigning, wherein use of the at least the fairness-based reservation parameter in the determining of the first subset of the resource pool to be reserved reduces a likelihood that the one or more tasks selected from the queue are starved of resources.

17. The non-transitory computer-accessible storage medium as recited in claim 16, wherein the particular scheduling iteration further comprises:

sorting share identifiers of at least a subset of the current task set based at least in part on respective resource usage metrics corresponding to the share identifiers; and selecting, from the queue, based at least in part on a result of the sorting, the one or more tasks to which one or more resources from the second subset of the resource pool are assigned.

18. The non-transitory computer-accessible storage medium as recited in claim 16, storing further program instructions that when executed on the processor further cause the processor to:

obtain, at the task scheduling service prior to the particular scheduling iteration, via a programmatic interface, an indication of a respective weight assigned to one or more share identifiers, wherein assigning the one or more resources further comprises:

distributing, among the one or more tasks selected from the queue, the one or more resources, based at least in part on respective weights assigned to share identifiers of the one or more tasks.

19. The non-transitory computer-accessible storage medium as recited in claim 16, storing further program instructions that when executed on the processor further cause the processor to:

determine, at the task scheduling service prior to the particular scheduling iteration, via a programmatic interface, a scheduling policy associated with the queue, wherein the scheduling policy indicates that tasks with a first share identifier can be assigned resources from the resource pool, and wherein during the particular scheduling iteration, a task with the first share identifier is assigned a resource from the resource pool;

obtain, at the task scheduling service after the particular scheduling iteration, via a programmatic interface, a request to change the scheduling policy, wherein in accordance with the change, resources of the resource pool are only to be assigned to tasks with a second share identifier specified in the request to change the scheduling policy; and assign, to a task with the second share identifier, one or more resources of the resource pool during another scheduling iteration initiated after the request to change the scheduling policy is received.

20. The non-transitory computer-accessible storage medium as recited in claim 16, storing further program instructions that when executed on the processor further cause the processor to:

obtaining, at the task scheduling service prior to the particular scheduling iteration, via a programmatic interface, an indication of a respective per-requester share identifier for tasks requested by individual members of a group of authorized task requesters, wherein during the particular scheduling iteration, a particular task requested by a member of the group is assigned a resource from the resource pool based at least in part on a particular per-requester share identifier of the particular task; and obtaining, at the task scheduling service after the particular scheduling iteration, via a programmatic interface, an indication of an additional per-requester share identifier for tasks requested by an additional task requester who has been included in the group of authorized task requesters, wherein, during a scheduling iteration performed after the particular scheduling iteration, an additional task requested by the additional task requester is assigned a resource from the resource pool based at least in part on a determination that the additional task has the additional per-requester share identifier.

* * * * *